March 17, 1970
E. M. STONER
3,500,718
RECOIL OPERATED AUTOMATIC GUN
Filed Aug. 23, 1967
14 Sheets-Sheet 1
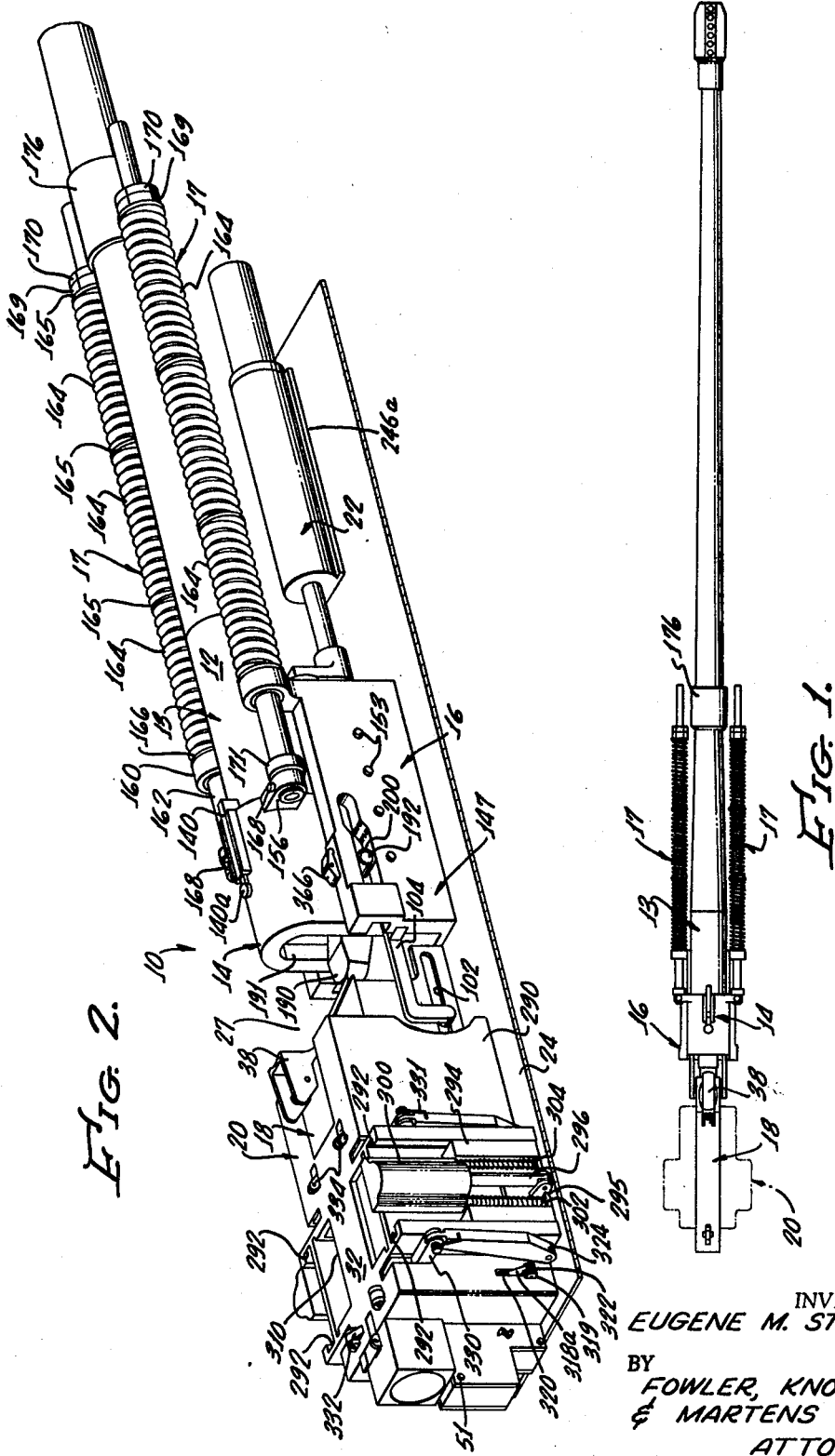
INVENTOR.
EUGENE M. STONER
BY
FOWLER, KNOBBE
& MARTENS
ATTORNEYS.

March 17, 1970  E. M. STONER  3,500,718
RECOIL OPERATED AUTOMATIC GUN
Filed Aug. 23, 1967  14 Sheets-Sheet 2
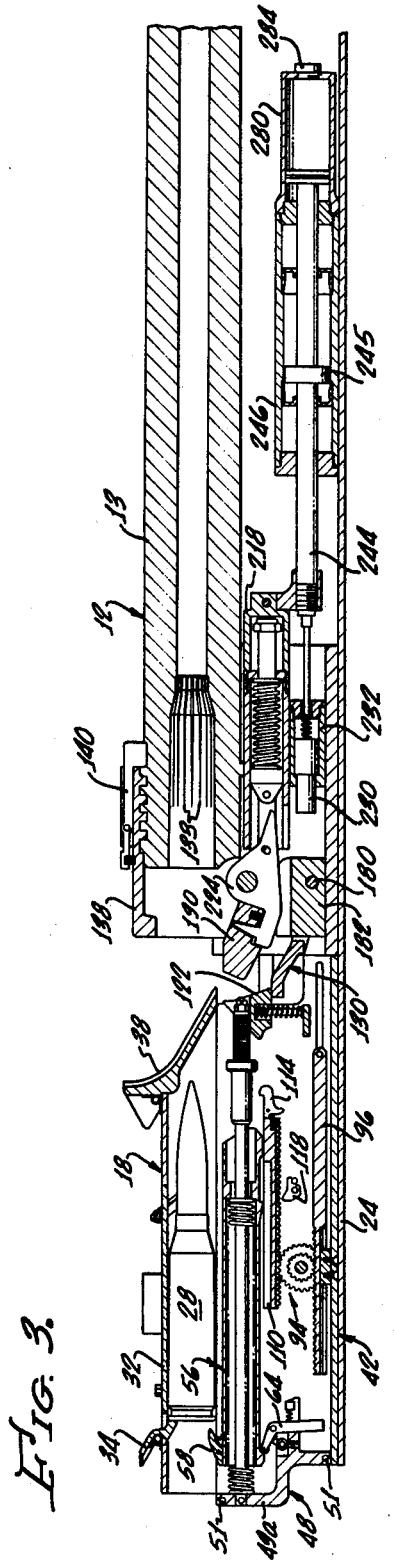
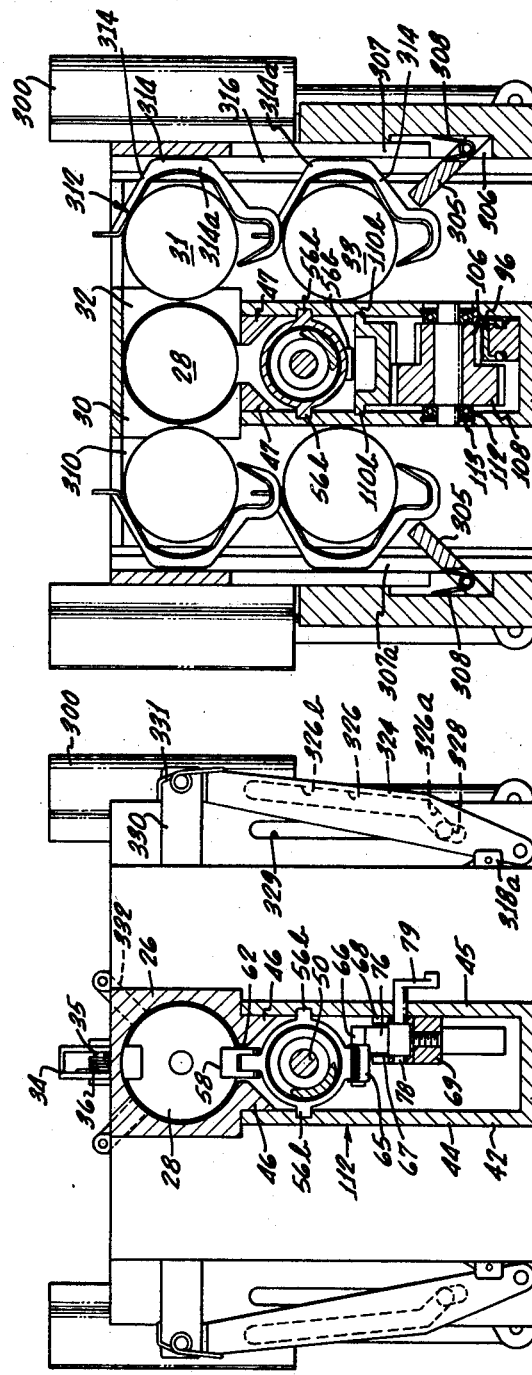
INVENTOR.
EUGENE M. STONER
BY FOWLER, KNOBBE
& MARTENS
ATTORNEYS.

March 17, 1970
E. M. STONER
3,500,718
RECOIL OPERATED AUTOMATIC GUN
Filed Aug. 23, 1967
14 Sheets-Sheet 3
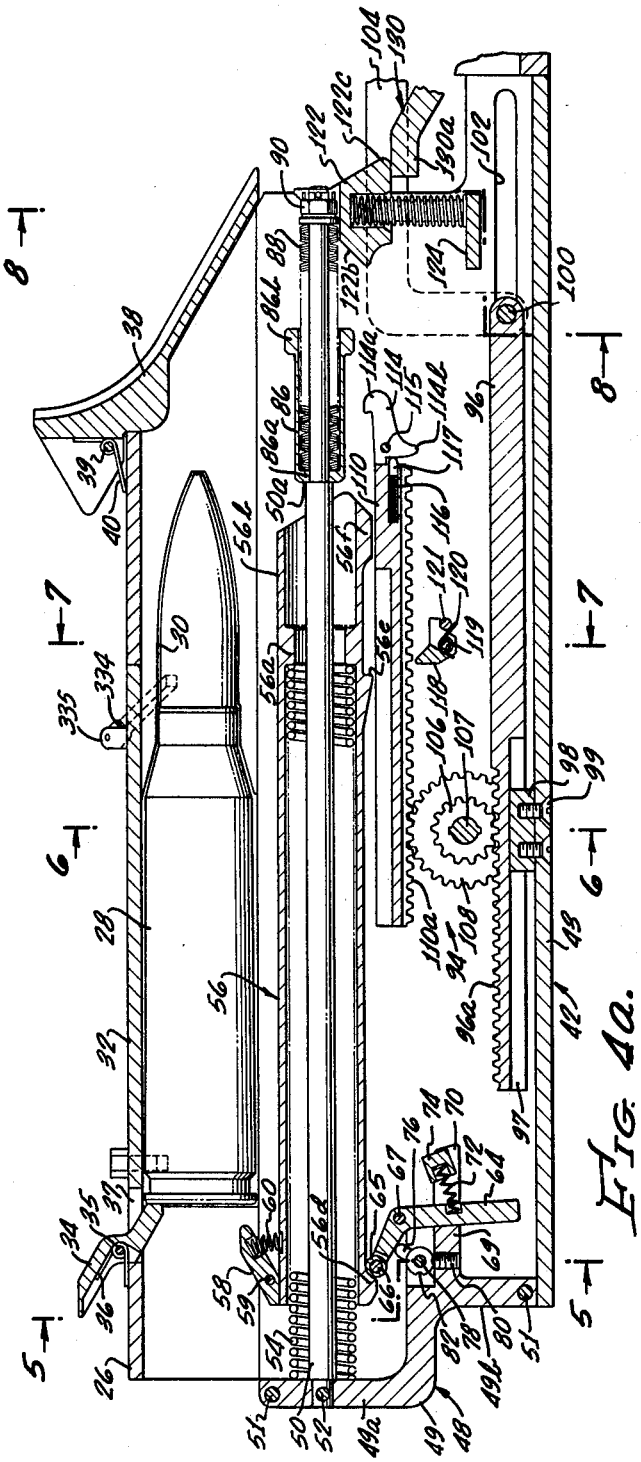
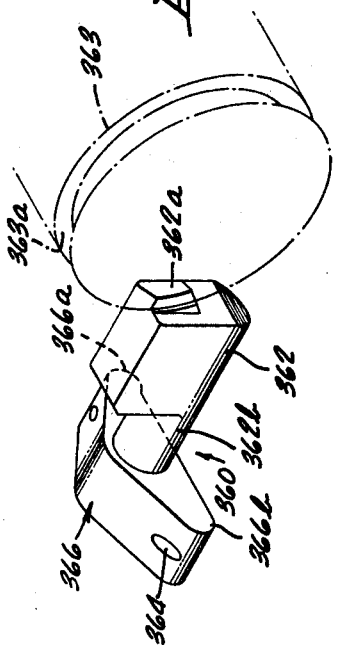
INVENTOR.
EUGENE M. STONER
BY
FOWLER, KNOBBE
& MARTENS
ATTORNEYS.

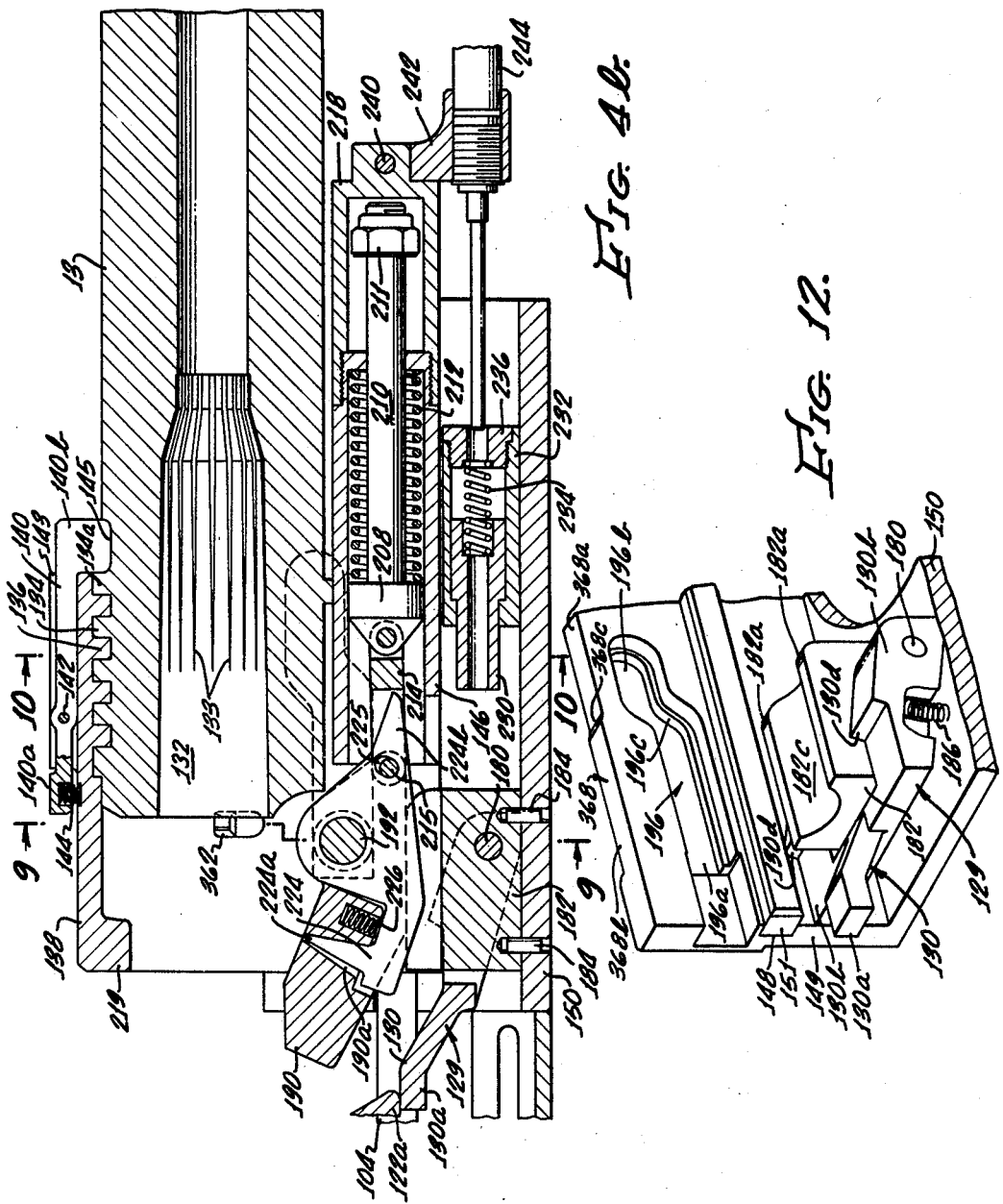

March 17, 1970 E. M. STONER 3,500,718
RECOIL OPERATED AUTOMATIC GUN
Filed Aug. 23, 1967 14 Sheets-Sheet 5

INVENTOR.
EUGENE M. STONER
BY
FOWLER, KNOBBE
& MARTENS
ATTORNEYS.

March 17, 1970  E. M. STONER  3,500,718
RECOIL OPERATED AUTOMATIC GUN
Filed Aug. 23, 1967  14 Sheets-Sheet 7

INVENTOR.
EUGENE M. STONER
BY FOWLER, KNOBBE
& MARTENS
ATTORNEYS.

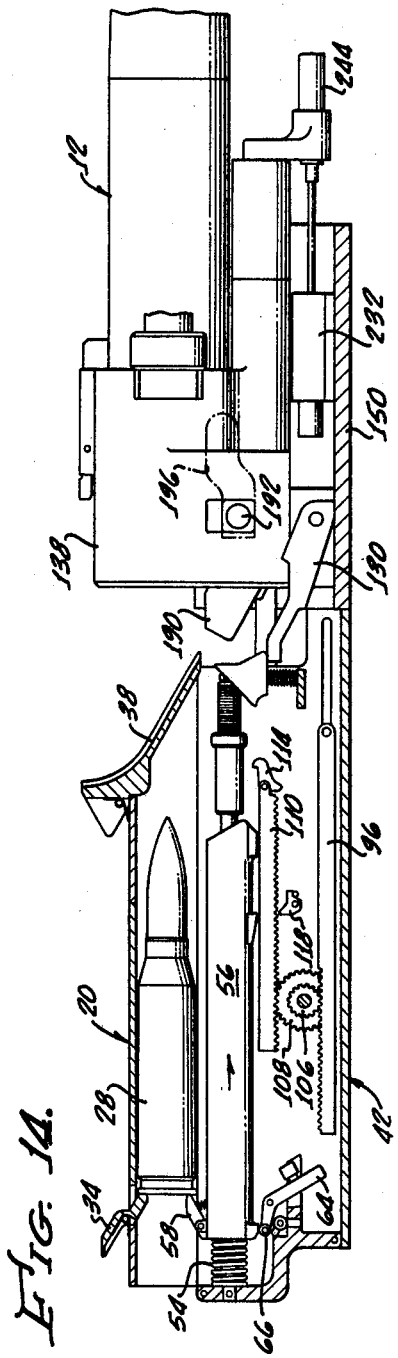
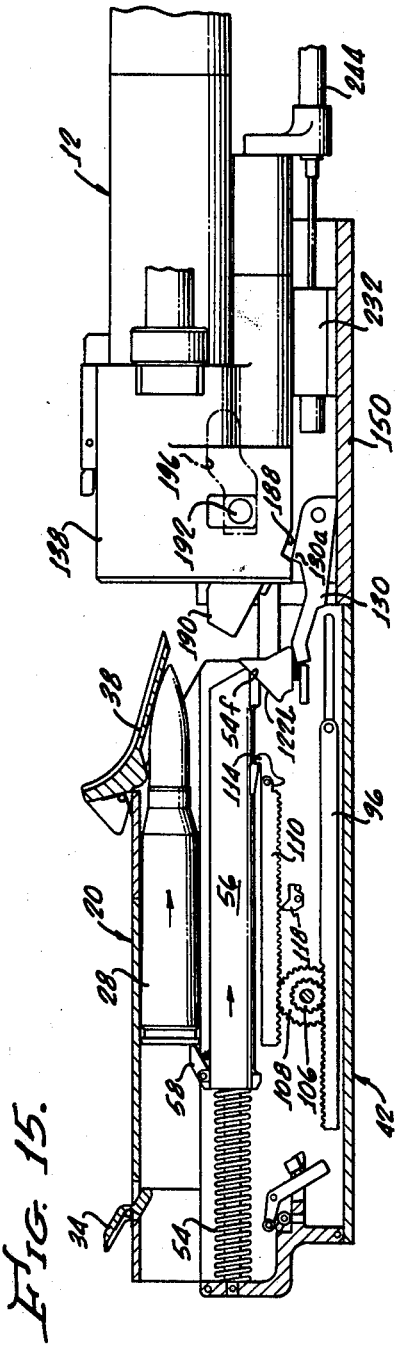
Fig. 14.
Fig. 15.
INVENTOR.
EUGENE M. STONER
BY
FOWLER, KNOBBE
& MARTENS
ATTORNEYS.

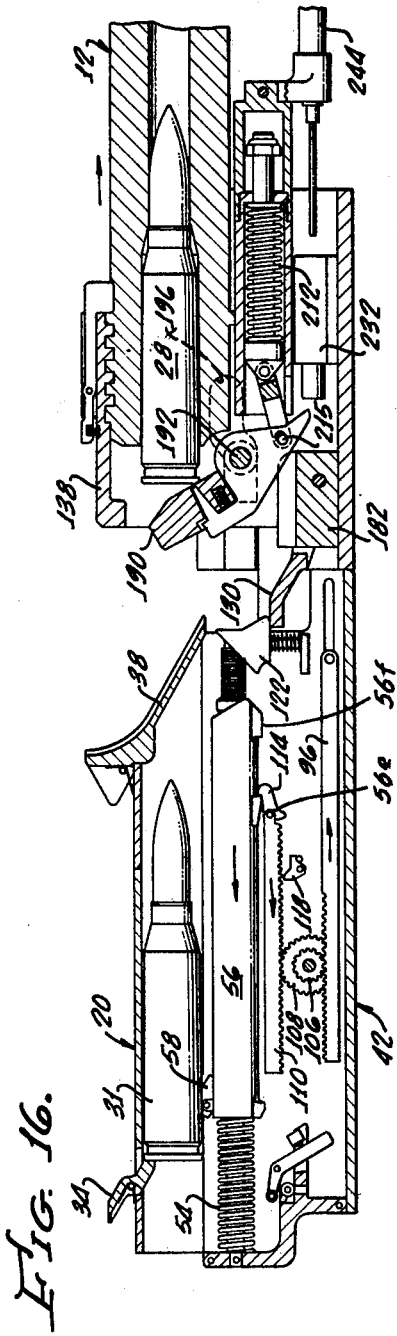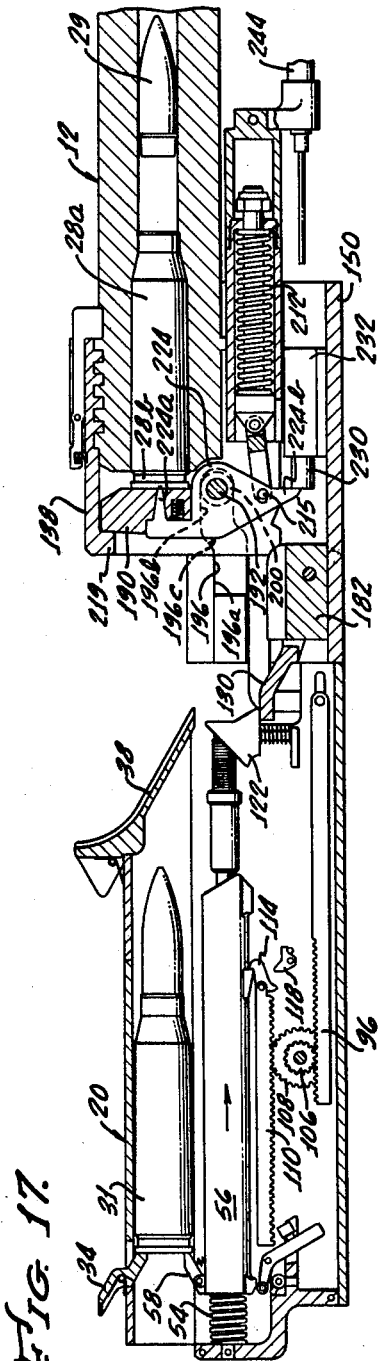

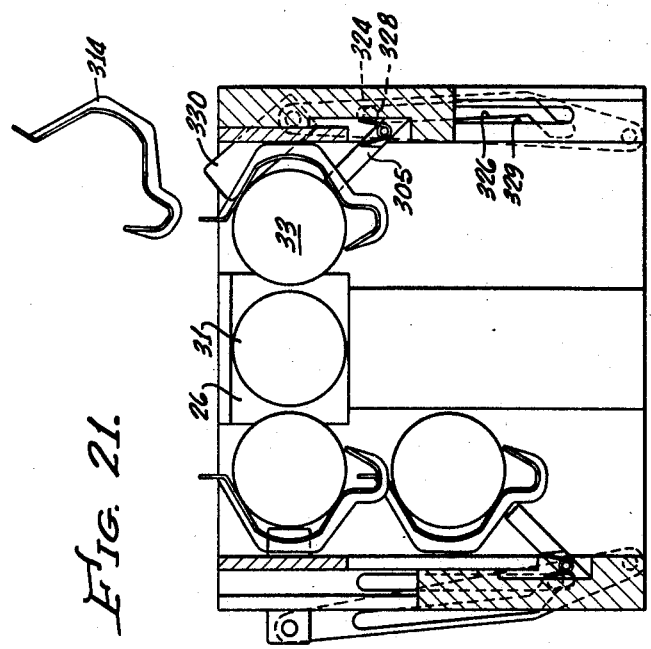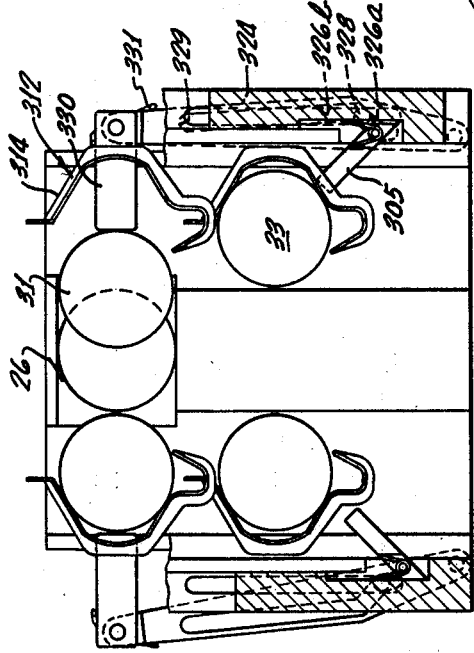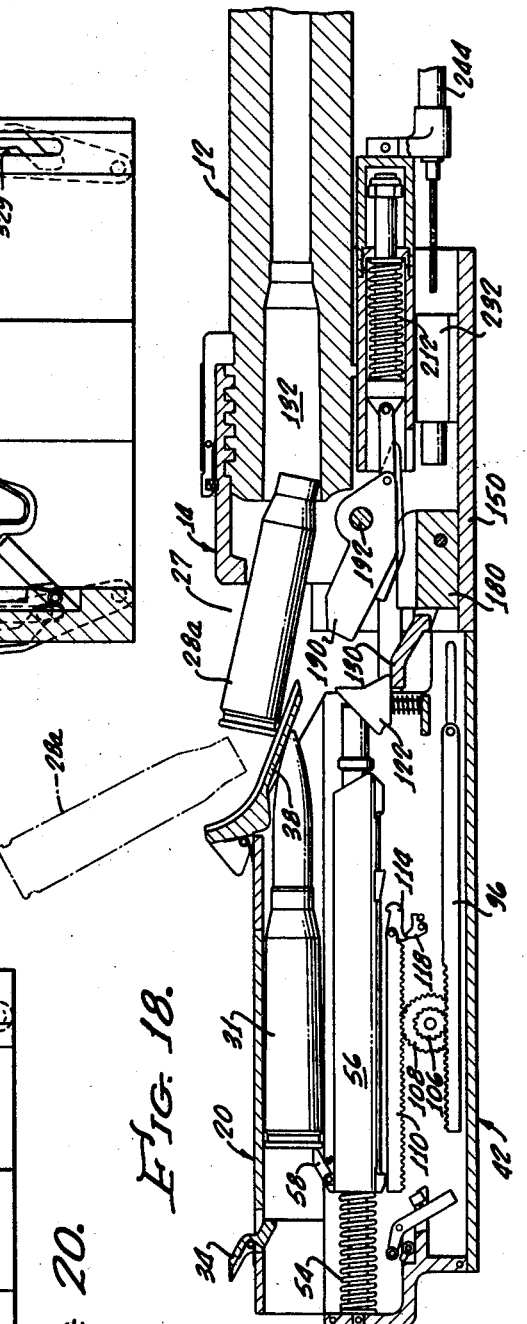

March 17, 1970 E. M. STONER 3,500,718
RECOIL OPERATED AUTOMATIC GUN
Filed Aug. 23, 1967 14 Sheets-Sheet 11

INVENTOR.
EUGENE M. STONER
BY
FOWLER, KNOBBE
& MARTENS
ATTORNEYS.

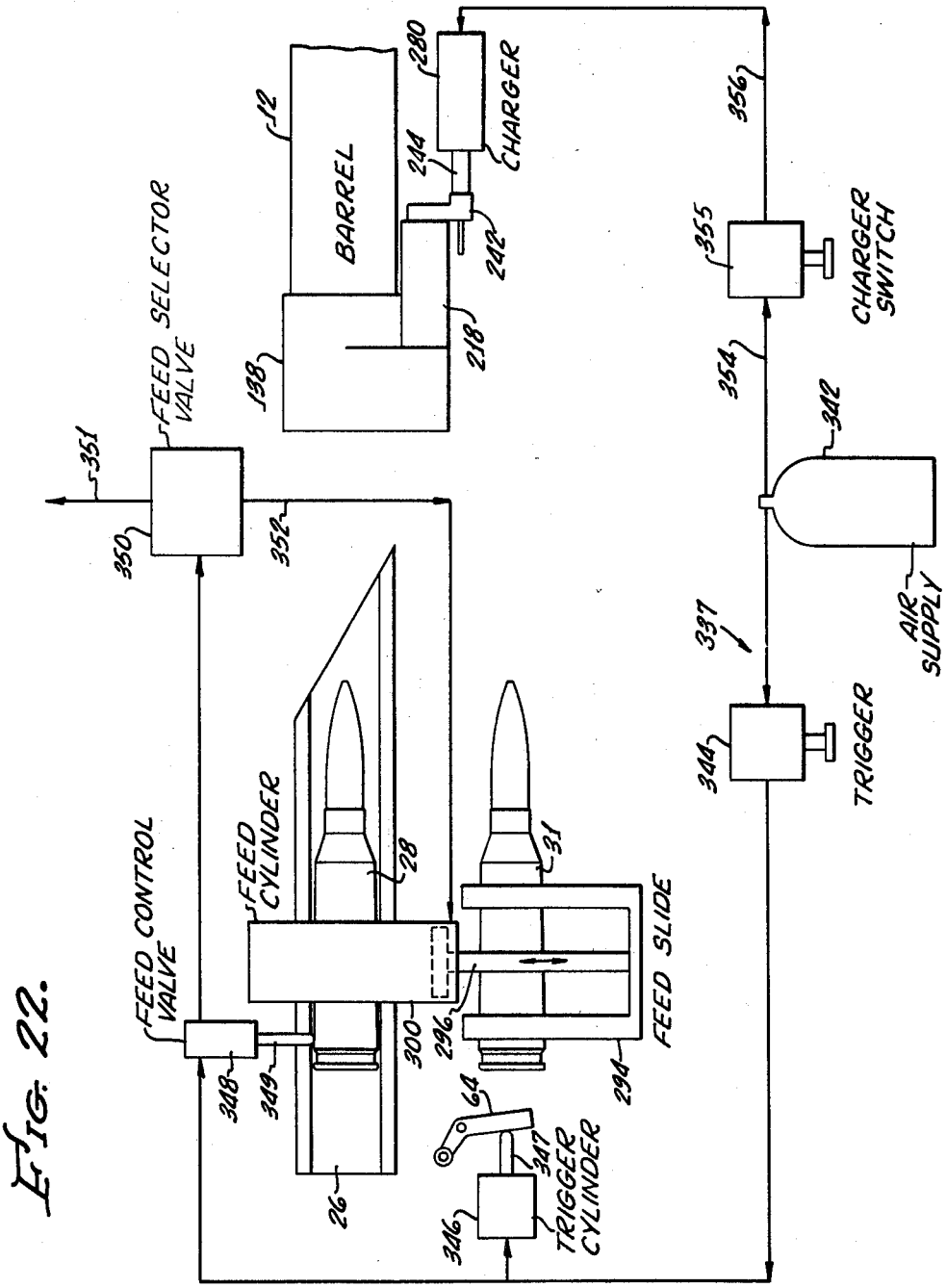

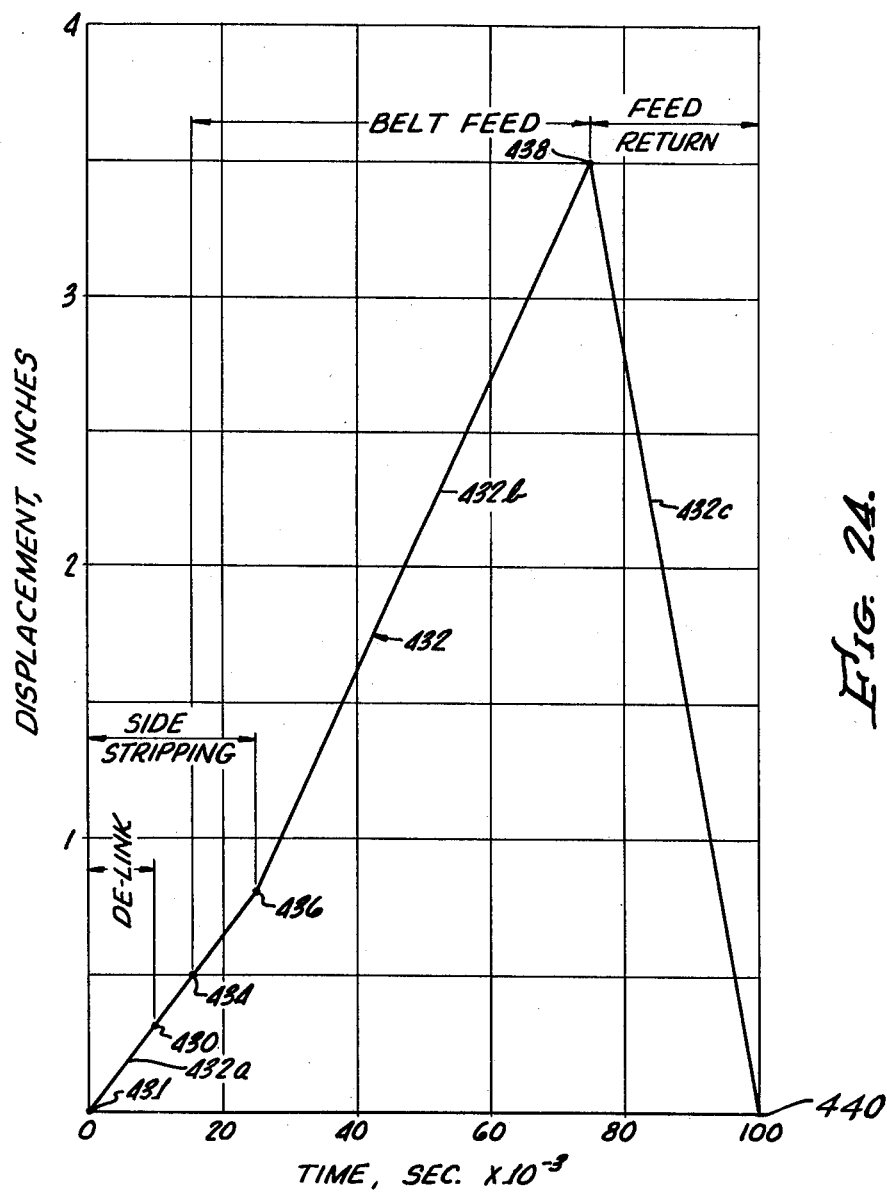

United States Patent Office 3,500,718
Patented Mar. 17, 1970

3,500,718
RECOIL OPERATED AUTOMATIC GUN
Eugene M. Stoner, Rte. 1, Box 70,
Port Clinton, Ohio 43452
Filed Aug. 23, 1967, Ser. No. 662,614
Int. Cl. F41d 7/00
U.S. Cl. 89—138        41 Claims

ABSTRACT OF THE DISCLOSURE

The firing cycle of a reciprocating gun barrel is arranged to overlap its ammunition ramming cycle. As the barrel is being driven forwardly by springs loaded by recoil forces from the previous firing, a round of ammunition is propelled into thet barrel by a spring-driven rammer operated by movement of the barrel; locked in the barrel by a rolling, pivoting breech block; and fired by a pivoting hammer. The recoil forces from the firing first overcome the forward momentum of the barrel and then drive the barrel rearwardly, during which time the spent cartridge is ejected and the next round is propelled by the rammer toward the barrel. A hydraulic buffer assembly including a variable area orifice limits movement of the barrel. An ammunition feed mechanism automatically feeds the rammer at the necessary speed as the absence of a round in the rammer is sensed.

BACKGROUND OF THE INVENTION

This invention relates to a recoil-operated automatic gun or cannon, particularly adapted to provide a high rate of fire for relatively large caliber ammunition.

It is highly desirable that a military weapon such as an automatic cannon provide an extremely high rate of fire especially when employed on or against high speed aircraft. A limiting factor in the firing rate of one type of automatic cannon is the need for a bolt mechanism to inject a round of ammunition into a barrel and to eject the spent cartridge. Typically, the bolt drives the round into the barrel, locks the round in the barrel as it is fired or detonated, and withdraws the spent cartridge. The next round is then fed between the end of the barrel and the retracted bolt and the cycle is repeated. Thus, the weapon cycling time must include ammunition feed time and the time required to reciprocate the bolt mechanism. This limitation is particularly troublesome with large caliber weapons in that the bolt mechanism must be relatively massive and thus the inertial forces become quite large in view of rapid reciprocation.

In this regard, it is of course very desirable that the overall weight of the weapon be kept to a minimum, particularly when the weapon is to be mounted in an aircraft. A relatively heavy bolt mechanism contributes to the weight problem.

Another difficulty of recoil-operated automatic guns employing a bolt mechanism is that trunnion forces are quite large in view of the recoiling masses involved. This naturally requires greater strength and results in increased weight and cost.

Guns designed to be mounted on military vehicles such as in armored cars or in aircraft, should be relatively compact and light as compared with stationary guns. The size of that portion of the gun from the ammunition feeding area rearward is particularly critical because the rear end of the gun, including usually the ammunition feed mechanism as well, extends within the interior of the vehicle. Since the gun is traversed to aim it, the space which must be allowed for the gun inside the vehicle, increases rapidly with the distance rearwardly from the ammunition feeding area.

In order to be suitable for field use, particularly as a military weapon, a rapid-firing automatic gun not only must fire satisfactorily, but also should be easy to repair and maintain in the field. Hence, the gun should be simply constructed and have as few parts as is consistent with good performance.

SUMMARY OF THE INVENTION

In accordance with this invention, a single barrel is mounted to axially reciprocate within a support. Drive springs connected to the barrel and the support receive recoil forces from the barrel and provide counter recoil forces driving the barrel forwardly. A rammer assembly located to the rear of the barrel propels a round forwardly into the barrel.

A breech assembly mounted on the barrel locks a round of ammunition within the barrel and detonates the round when the barrel is moving forwardly under the impulse of the drive spring means. Consequently, the recoil forces produced by the detonation must first overcome the forward momentum of the barrel before the barrel will reverse direction and move rearwardly. In this manner, the velocity of the heavy barrel is kept low and hence trunnion forces are low.

The breech assembly also unlocks the barrel as the barrel is moving rearwardly responsive to recoil forces, and the cartridge of the spent round of ammunition is ejected making room for a second round of ammunition. Being interconnected to the breech ring assembly, and hence the barrel, the rammer assembly is operated by movement of the barrel to cause a round of ammunition to be propelled toward the barrel as the cartridge of the previous spent round of ammunition is being ejected. Consequently, a very high rate of fire can be obtained even with relatively large caliber ammunition.

The breech assembly preferably includes a pivotally mounted breech block which is moved into and out of position closing the end of the barrel by cam means included in the barrel support. Movement of the barrel is used to cause the cam means to move the breech block. Adding to the speed of operation is the fact that the breech block does not move a great amount relative to the barrel and is relatively light in weight, compared to a bolt for a comparable weapon.

In a preferred example of the invention, the rammer assembly includes a relatively lightweight spring-driven rammer for propelling a round of ammunition forwardly into the barrel. The rammer is cocked or loaded by a gear arrangement connected to be driven by movement of the barrel.

To quickly move a round of ammunition into the rammer assembly after a round is propelled forwardly by the rammer spring-driven means, there is provided as another aspect of the invention a high speed ammunition feed mechanism. While this mechanism is particularly useful in the gun combination described above it is also useful in other automatic rapid firing weapons. This mechanism includes a frame attached to the rammer assembly, a feed slide within the frame for elevating a belt of ammunition, and means for side-stripping a round from the belt with a sideways movement into an opening in the side of the rammer assembly. Through cam means, the upward movement of the feed slide provides sideways thrust to quickly de-link a round and move it into the rammer assembly. A feed mechanism of this type may be situated on both sides of the rammer assembly to handle different types of ammunition as selected.

The ammunition feed mechanism is operated or controlled by a pneumatic control system which includes a device for indicating the absence of a round of ammunition in the rammer assembly so that another round is automatically fed into the assembly.

The gun also includes a buffer assembly for receiving recoil and counter recoil forces produced by the gun. This buffer assembly preferably includes a piston attached to the barrel and confined within a hydraulic cylinder fixed to surrounding supporting structure. On each end of the piston within the cylinder there is positioned a restriction which reduces the diameter of the cylinder; thus, as the piston moves toward either of the restrictions, the resistance to movement is increased. Preferably, the buffer cylinder further includes spring members to limit movement of the piston.

DETAILED DESCRIPTION AND DRAWINGS

For a more thorough understanding of the invention, reference may be had to the following description and drawings in which:

FIG. 1 is a top plan view of a gun constructed in accordance with the invention;

FIG. 2 is a perspective view of the rear, main portion of the gun;

FIG. 3 is a side cross-sectional view of the portion of the gun illustrated in FIG. 2;

Figure 4C:
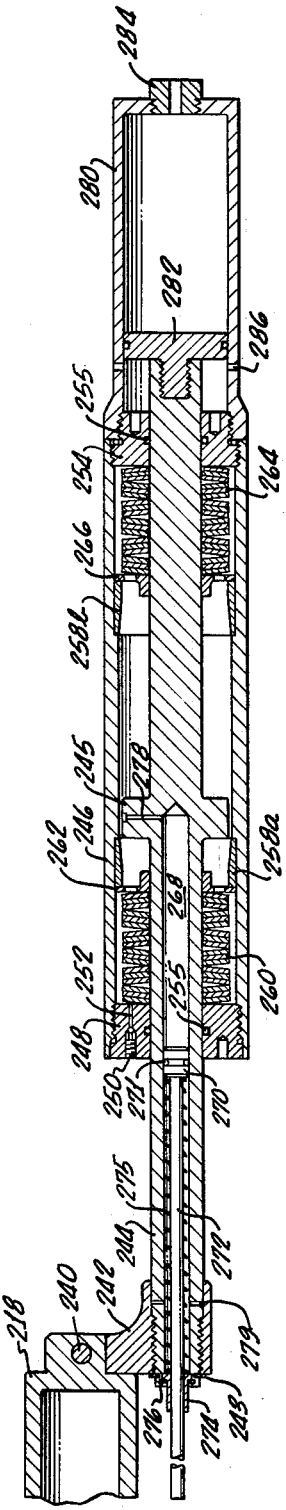
Figure 11:
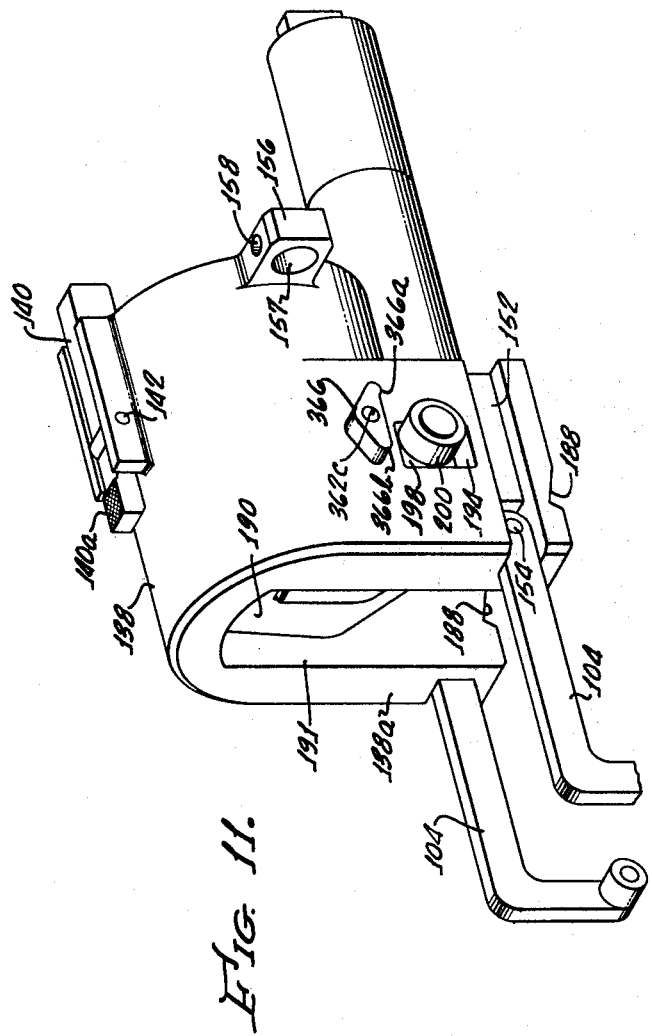
Figure 7:
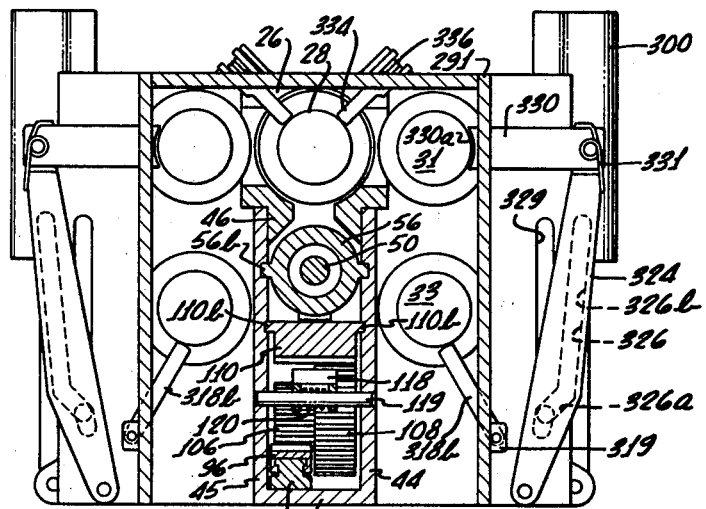
Figure 8:
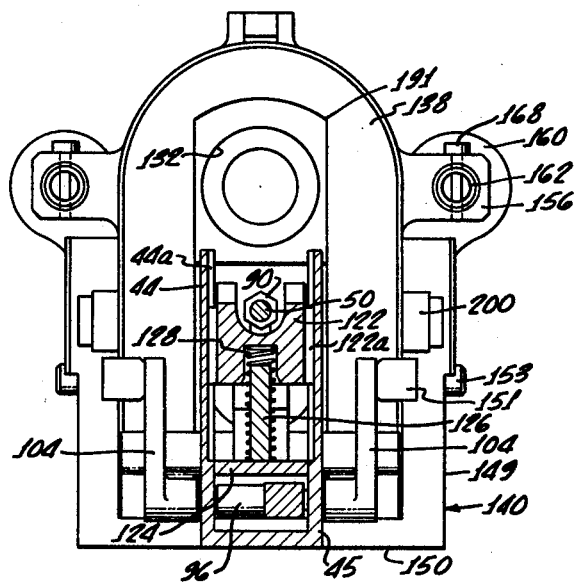
Figure 9:
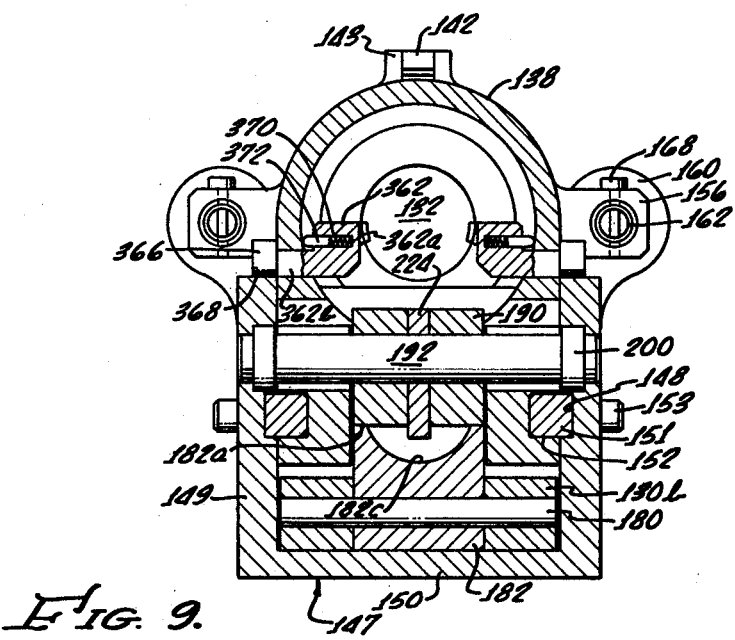
Figure 10:
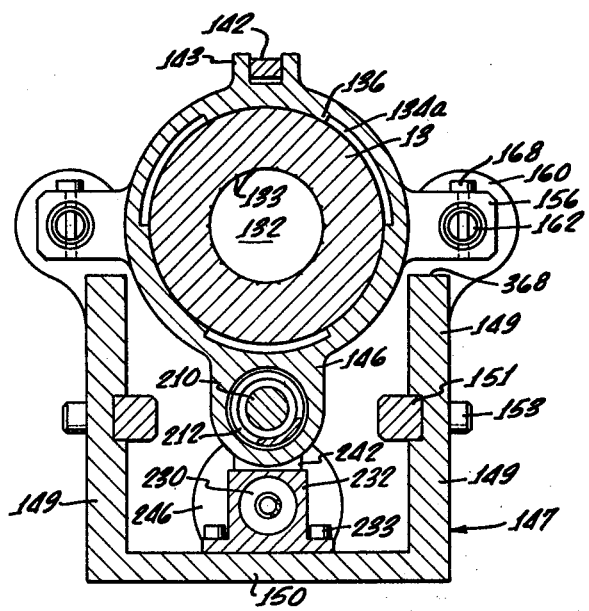
Figure 19:
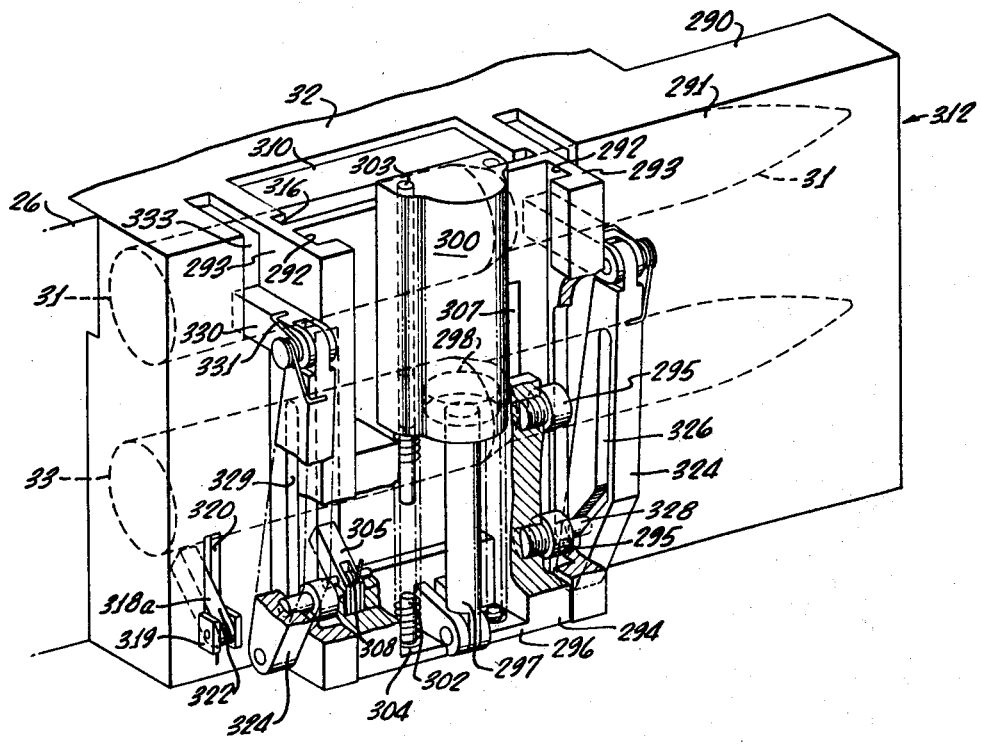
Figure 23:
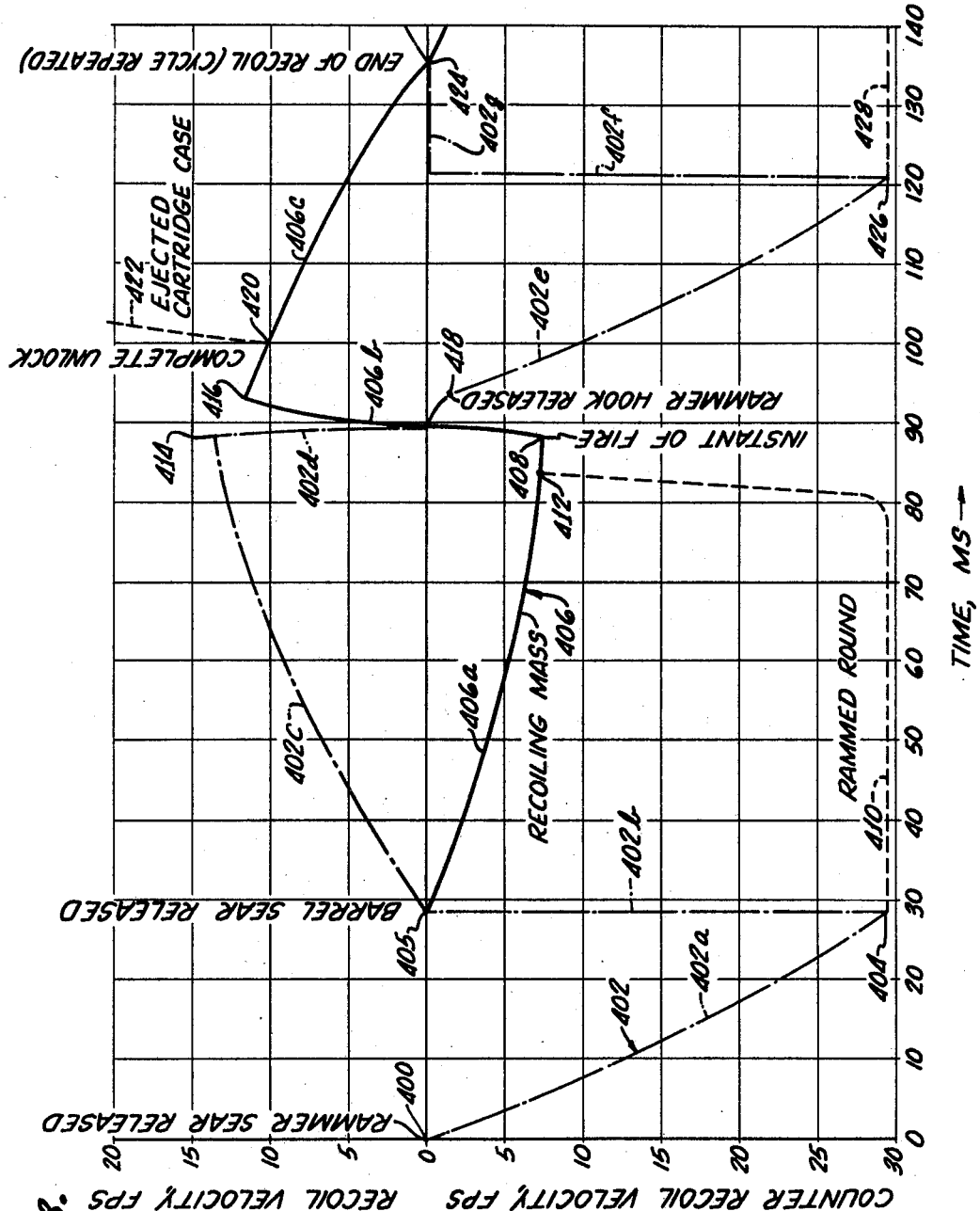

FIGS. 4a, 4b, and 4c are enlargements of portions of the view in FIG. 3;

FIG. 5 is a cross-sectional view on line 5—5 of FIG. 4a illustrating the rammer sear and a portion of the feed mechanism;

FIG. 6 is a cross-sectional view of line 6—6 of FIG. 4a showing further portions of the rammer assembly and the feed mechanism;

FIG. 7 is a cross-sectional view on line 7—7 of FIG. 4a looking rearwardly to illustrate portions of the rammer assembly and the feed mechanism;

FIG. 8 is a cross-sectional view on line 8—8 of FIG. 4a showing a portion of the barrel sear mechanism;

FIG. 9 is a cross-sectional view on line 9—9 of FIG. 4b showing the breech section of the gun;

FIG. 10 is a cross-sectional view on line 10—10 of FIG. 4b showing additional structure of the breech section;

FIG. 11 is an enlarged perspective view of the breech ring assembly;

FIG. 12 is an enlarged cut-away perspective view showing a portion of the breech block cam assembly;

FIG. 13 is an enlarged perspective view of the cartridge ejector mechanism;

FIGS. 14–18 are side elevational views, partially in section, of the main portion of the gun illustrating its operation;

FIG. 19 is an enlarged perspective view of a portion of the ammunition feed mechanism;

FIGS. 20 and 21 are end elevational views, partially in section, showing the operation of the feed mechanism;

FIG. 22 is a diagram of the pneumatic control system for the gun;

FIG. 23 is a graphic and schematic illustration of the velocity time relationship of the rammer and the barrel; and FIG. 24 is a graphic and schematic showing of the time displacement relationship of the ammunition feed mechanism.

Referring first to FIGS. 1–3, the gun may be considered to have several major assemblies including a barrel assembly 13; a breech ring assembly 14 attached to the rear of the barrel assembly; a breech block cam assembly 16 in which the combined barrel assembly and breech ring assembly are mounted for axial reciprocation; a drive spring assembly 17 connected between the breech block cam assembly and the combined barrel and breech ring assemblies; a rammer assembly 18 located to the rear of the breech block cam assembly 16 and axially aligned with the barrel assembly 13 for receiving a round of ammunition and for propelling the round forwardly into the barrel; an ammunition feed mechanism 20; and a buffer-charger assembly 22.

The rear of the gun may be secured to a variety of mounts, depending on the use for the weapon. No particular mount is described herein but for purposes of illustration the breech block cam assembly 16, the rammer assembly 18, and the buffer-charger assembly 22 are removably attached to a supporting housing 24 which may be mounted for movement in suitable trunnions (not shown).

(I) Rammer assembly (a) *Rammer.*—The rammer assembly will be described with particular reference to FIG. 4a as well as with reference to the various sections illustrated in FIGS. 5–8. The rammer assembly 18 includes a tubular ammunition receiver 26 having an inner diameter adequate to receive a round of ammunition 28 shown positioned within the tube. While the gun can be made in a variety of sizes, the illustrated embodiment is designed for 35 millimeter ammunition. The receiver 26 has openings 30 on either side for receiving ammunition from the ammunition feed mechanism 20 (see FIG. 6).

Actually, the entire central top portion of the receiver 26 is open and an upper plate 32 of the ammunition feed mechanism 20 mates with the tube to cover the open top. Note that the rear end of the receiver 26 is also open, even though the ammunition enters from the sides.

A holding pawl 34 is pivotally mounted on a pin 35 secured to the rear upper portion of the ammunition receiver 26. The lower portion of the pawl 34 is urged by a pawl spring 36 clockwise in FIG. 4a to extend downwardly through an opening 37 in the upper wall of the rammer tube 26. The lower end of the pawl 34 engages the rear of the round of ammunition 28 to prevent the round from sliding rearwardly in the tube.

The forward end of the receiver 26 is tapered rather sharply so that the upper portion is considerably shorter than the lower portion. This creates an outlet 27 between the tube and the breech block cam assembly 16 through which spent cartridges are ejected. A cartridge or case deflector 38 covers the front end of the receiver 26 and is pivotally mounted on a pin 39 attached to the forward end of the receiver. A deflector spring 40 extending between the upper portion of the deflector and the receiver 26 urges the deflector clockwise in FIG. 4a into a position closing the forward end of the tube. However, the free end of the deflector 38 may be pivoted upwardly by the round of ammunition 28 as it is propelled forward by the rammer assembly.

As can be seen from the cross-sectional views in FIGS. 5 and 6, an elongated U-shaped housing 42 having a bottom wall 43 and sidewalls 44 and 45 is positioned beneath the ammunition receiver 26. The upper ends of the housing sidewalls 44 and 45 are attached by suitable means to lugs 46 depending from the receiver 26.

Still referring particularly to FIG. 4a, a back plate assembly 48 fits within the housing 42. The back plate assembly 48 includes an irregularly shaped back plate 49 having an upper vertical portion 49a which closes the back of the upper portion of the U-shaped housing 42, and a lower vertical portion 49b which fits within the lower portion of the housing 42 to close that area as well. The back plate 49, carrying various components to be described, is attached to the rammer assembly by only two quick-disconnect pins 51 which extend through the upper and lower end of the back plate 49 and the sidewalls 44 and 45 of the rammer housing 42.

A rammer rod 50 extends through an opening in the back plate 49 and is attached to the plate by a pin 52 extending through the rod and plate. As can be seen from FIG. 4a, the rammer rod 50 extends forward through the housing 42 for the length of the rammer assembly. Carried on the rammer rod 50 are means for driving a round of ammunition forward in the ammunition receiver 26. This includes an elongated rammer compression spring 54 surrounding the rod 50 and a tubular rammer 56 surrounding the rammer spring 54. The spring 54 extends between the inner wall of the back plate upper portion 49a and and inwardly extending annular flange 56a formed on the rammer 56.

A rammer pawl 58 is pivotally mounted on a pin 59 transversely mounted to the upper rear wall of the rammer 56. This pawl 58 is urged upwardly in a counter-clockwise direction in FIG. 4a by a compression spring 60 which extends between the end of the pawl and the upper wall of the rammer 56. This rammer pawl 58 extends upwardly into the receiver 26 through an elongated slot 62 formed in the lower wall of the receiver between the depending lugs 46 (see FIG. 5). The pawl 58 engages the rear of the round of ammunition 28 when the rammer 56 is driven forwardly.

As is illustrated in FIG. 5, the rammer 56 is formed with a pair of outwardly extending ribs 56b on its opposite sidewalls which slide within mating grooves in the housing sidewalls 44 and 45. The grooves extend in a direction parallel to the barrel axis so that the rammer 56 will reciprocate on such a line.

(b) *Rammer sear.*—The rammer spring 54 and rammer 56 are shown in FIGS. 4a and 5 in their most rearward position with the rammer spring cocked or loaded. The rammer 56 is locked in this position by the engagement of a lug 56d depending from the lower rear surface of the rammer 56 with a pivotally mounted sear 64. More specifically, the lug 56d is engaged by the roller 65 mounted on a pin 66 carried on the end of the sear 64. The sear 64 is pivoted to a pin 67 carried by arms 68 formed integral with an inwardly extending flange 69 on the back plate 49.

The flange 69 is formed with an opening 70 through which the lower leg of the sear 64 extends. A compression spring 72 extending between the lower leg of the sear 64 and a pad 74 carried by the flange 69 urges the sear 64 to pivot in a clockwise direction, as viewed in FIG. 4a, to latch the spring-driven rammer 56. The lever 64 can be pivoted against the urging of the spring in a manner to be described below to unlatch the rammer and commence operation of the gun.

For positively locking the sear 64 in the latched position, there is provided a safety 76 fixed on a shaft or pin 78 pivotally mounted on the flange 69. In FIGS. 4a and 5, the safety 76 is in the locked position holding the sear 64 in the rammer latching position. The safety lever 76 is held in this position by a spring-biased detent 80 which engages a mating depression formed in the periphery of the safety. To unlock the sear 64, the safety 76 is rotated in a counter-clockwise direction as viewed in FIG. 4a by means of a handle 79 to a position wherein the safety 76 does not prevent the sear 64 from being pivoted in a counterclockwise direction. A second depression 82 is formed in the periphery of the safety 76 to retain the safety in the unlocked position.

(c) *Rammer buffer.*—A tubular buffer housing 86 surrounds a reduced diameter portion 50b of the rod 50 forward of the rammer 56. An inwardly extending flange 86a formed on one end of the housing 86 engages a shoulder 50a on the rod 50, as can be seen in FIG. 4a. A stack of Belleville springs 88 within the tubular buffer housing 86 engage the flange 86a and extends beyond the buffer housing 86 to engage a nut 90 threaded onto the forward end of the rod 50.

The inner diameter of the flange 56a and the forward tubular portion of the rammer 56 are sized to permit the rammer to telescope onto the buffer housing 86 so that the leading edge of the annular flange 56a engages the rear edge of an outwardly extending flange 86b formed on the buffer housing. Thus, the spring washers 88 confined by the buffer housing 86 serve to reduce or absorb the forward momentum of the spring-driven rammer 56 after a ramming operation.

The lower leading edge 56f of the rammer member 56 is angled at approximately 45° with respect to the rammer rod 50 which, of course, is parallel to the path of movement of the cylindrical rammer 56.

(d) *Rammer spring cocker.*—For loading or cocking the rammer spring 54, there is provided a novel rack and pinion mechanism 94. This mechanism includes an elongated lower rack 96 having its rear lower portion an elongated slot 97 with a T-shaped cross-section, as can be seen in FIG. 6. A guide 98 secured by suitable screws 99 to the lower wall 43 of the housing 42 is provided with a corresponding T-shaped cross-section on its upper portion which is received in the slot 97. A quick-disconnect pin 100 extends through the leading edge of the lower rack 96 and through a pair of elongated slots 102 formed in the sidewalls 44 and 45 of the housing 42.

On the rear upper surface of the lower rack 96, there are formed a plurality of rack gear teeth 96a which cooperate with the teeth on a small pinion gear 106 mounted on a shaft 107 which extends through or into the sidewalls 45 and 44 of the housing 42. A larger pinion 108 is mounted on the same shaft 107 and cooperates with the teeth 110a formed on the lower surface of an upper rack 110. As is shown in FIG. 6, the rack 110 has outwardly extending lugs 110b which slide within mating slots formed in the sidewalls 44 and 45 of the housing 42. The shaft 107 is preferably mounted on ball bearings 112 which are retained adjacent to the pinion gears by retaining rings 113. In the example shown, the size ratio between the large and small pinions 108 and 106 is approximately 1.77 to 1; with the result that the upper rack 110 moves at a correspondingly greater rate than the lower rack 96.

Again referring to FIG. 4a, a rammer charging latch 114 is mounted on a pin 115 secured to the forward end of the upper rack 110. The forward portion of the latch includes an upwardly extending, rearwardly facing hook 114a, which is in the path of a depending hook 56e formed on the lower surface of the rammer 56. A rammer latch spring 116 is mounted within a socket in the forward end of the upper rack 110 at a level below the pin 115, and a detent element 117 is urged by the spring 116 into engagement with the rammer latch 114. This produces a counter-clockwise torque on the latch, as viewed in FIG. 4a, urging the latch into position wherein it will engage the depending hook 56e when the latch and the depending hook are at the same axial location.

The rammer latch 114 is also provided with a depending tongue 114b which moves in a path to engage a latch release 118 pivotally mounted on a pin 119 positioned in the sidewalls 44 and 45 of the housing 42, as can be seen in FIG. 7. A latch release spring 120 is mounted on the pin 119 to urge the latch release 118 clockwise in FIG. 4a into the path of the depending tongue 114b. A stop pin 121 mounted in the housing walls 44 and 45 limits the movement of the latch release 118 in a clockwise direction, as viewed in FIG. 4a, but permits movement in the other direction.

(II) Barrel, breech ring and breech block cam assemblies (a) *Barrel and breech ring.*—Referring now to FIG. 4b for a description of the breech section of the gun, it can be seen that a barrel 13 in the barrel assembly 12 has a chamber 132 formed in its rear end for receiving a round of ammunition. Flutes 133 on the chamber walls reduce friction between the walls and a cartridge to facilitate ejection of the cartridge. The outer rear portion of the barrel is provided with a series of interrupted arcuate ribs 134 which mate with grooves between similar interrupted ribs 136 formed on the interior of a strong relatively massive breech member or ring 138. As can be seen in FIG. 10, the ribs are in three axially aligned sets that extend arcuately approximately 60° and are arcuately spaced 60°. Thus, in assembly, the spaces of the breech ring are arcuately aligned with the ribs on the barrel so that the ring may be moved axially into the barrel. When the proper axial depth is reached, the ring 138 is rotated 60° so that the ribs 134 and 136 are arcuately aligned and interengaged as shown.

Referring to FIGS 4b and 9, to lock the breech ring 138 to the barrel in this position, there is provided a barrel latch 140 pivotally mounted on a latch pin 142 supported by lugs 143 on the breech ring 138. A latch spring 144 extends between the rear 140a of the barrel latch and the breech ring, urging the barrel latch in a clockwise direction, as viewed in FIG. 4b, so that the massive forward depending lug 140b on the barrel latch fits within a notch 145 in the upper wall of the barrel immediately in front of the leading barrel rib 134a. In order to release the ring 138 from the barrel 13, it is necessary to depress the rear end 140a of the barrel latch 140 to pivot the forward end 140b upwardly.

(b) *Breech block cam.*—The breech block cam assembly 16 includes a breech block cam 147 which is a generally U-shaped support member having, as seen from FIGS. 9, 10 and 12, a pair of axially extending grooves 148 formed in its sidewalls 149. Secured to the cam 147 within these grooves by suitable fasteners 153 (FIG. 2) are a pair of axially extending hardened tracks 151 each having a square cross-section which mates with the grooves 148 and with grooves 152 formed in the lower rear portion 138a of the exterior of the breech ring 138. This track and groove arrangement sildeably supports the weight of the barrel and breech ring assembly within the breech block can assembly 16 for high speed axial reciprocation.

(c) *Barrel sear mechanism.*—Referring now to FIGS. 4b, 9 and 12, a barrel sear mechanism 129 releasably latches the barrel against axial reciprocation relative to the breech block cam. The barrel sear mechanism includes a sear lever 130 having bifurcated forward arms 130b. A transverse pin 180 extends through the arms 130b and through a cam block 182 which is secured to the bottom wall 150 of the breech block cam 147 by suitable threaded fasteners 184. Springs 186 extend between the arms 130b of the barrel sear and the bottom wall 150 to urge the tongue 130a of the barrel sear upwardly, or in a clockwise direction, as viewed in FIG. 12. Each arm 130b of the barrel sear includes a sear surface 130d which faces rearwardly to engage notches 188 formed in the lower wall of the breech ring 138, as can be seen in FIG. 11. The sear surfaces 130d engage the notches 188 of the breech ring attached to the barrel to hold the barrel in its rearward-most position when the gun is at rest.

Referring now to FIGS. 4a and 8, a releaser for the barrel sear mechanism 129 includes a sear plunger 122 mounted for vertical reciprocation in the forward portion of the rammer housing 42. As can be seen in FIG. 8, the sidewalls 44 and 45 of the housing 42 are formed with vertically extending slots 44a which receive outwardly extending, vertically oriented lugs 122a formed on the sear plunger 122. The upper surface of the sear plunger 122 is bifurcated to receive the forward end of the rammer rod 50. A shelf 124 extends between sidewalls 44 and 45 of the housing 42 at the base of the vertical slots 44a and 45a. An upwardly extending spring guide rode 126 is supported by the shelf 124 while a compression spring 128 urging the sear plunger 122 upwardly surrounds the guide rod 126 and extends into a socket formed in the lower surface of the sear plunger 122.

The trailing surface 122b on the plunger sear is angled at approximately 45° to mate with the angled surface 56f on the lower forward portion of the cylindrical rammer member 56. When the rammer member 56 reaches its forward-most position, surface 56f engages the sear plunger surface 122b converting the forward motion of the rammer 56 to downward movement of the sear plunger. The lower forward portion of the sear plunger is engaged with the rearward tongue 130a of the barrel sear 130. Downward movement of the plunger 122 depresses the tongue 130a causing the barrel sear 130 to pivot about the pin 180 to release the breech ring 138 attached to the barrel 13.

(d) *Barrel to rammer connection.*—Referring to FIGS. 2, 4a, 4b, 8 and 11, a pair of connecting bars 104 are secured by suitable pins 154 to the lower, rear portion 138a of the breech ring and to the ends of the pin 100 to drive the lower rack 96 of the rammer assembly so that the lower rack is reciprocated with the barrel 13 and the breech ring 138. The connecting bars 104 have a right angle bend joining horizontally and vertically oriented portions. The rear ends of the bars straddle the forward end of the rammer housing 42, and the forward ends are disposed inwardly from the grooves 152 so as not to interfere with the movement of the breech ring 138 on the tracks 151.

(e) *Breech block.*—For opening and closing the end of the barrel chamber 132, there is provided a rugged breech block 190 having a shape which fits within the inverted U-shaped opening 191 in the breech ring 138, as can be seen from FIG. 11. The breech block 190 is mounted on a pin 192 which extends through vertically elongated openings 194 in the sidewalls of the breech ring 138 and further extend into elongated cam slots 196 formed in the sidewalls 149 of the U-shaped breech block cam 147. A pair of square shaped shoes 198 are mounted on the breech block pin 192 to support the pin slideably within the openings 194. On the outer ends of the breech block pin 192, are positioned a pair of rollers 200 which ride within the cam slots 196. The cam slots 196 are formed with a lower, rear, horizontally extending portion 196a, connected by a sloping intermediate portion 196c to a forward higher horizontally extending portion 196b. In the example of the invention illustrated, the portion 196c is oriented at an angle of about 39° with respect to the horizontal. In view of this relationship, the rollers 200 carrying the pin 192 and the breech block 190 are moved up and down by the cam slots 196 as the barrel is axially reciprocated.

In a plunger housing 146 formed integral with the breech ring 138 and located beneath the barrel, there is slideably positioned a plunger piston 208 attached to a piston rod 210, and a plunger compression spring 212 surrounding the rod 210 and urging the piston 208 rearward. A plunger link 214 having one end pivotally connected to piston 208 and its other end pivotally connected by a pin 215 to the base or bottom of the breech block 190, provides a constant force on the breech block in a clockwise direction as viewed in FIG. 4b. Or, in other words, the breech block 190 is constantly urged to pivot to a vertical position where it blocks or obstructs the entrance to the barrel chamber 132, and is in position to be moved by cam slots 196 to the upper position wherein the barrel chamber is locked or closed by the breech block.

The forward end of the plunger housing 146 is enclosed by an elongated cap 218 which covers the forward end of the piston rod 210 and a nut 211 mounted on the end of the rod. In FIGS. 4b and 9, the breech block 190 cannot be pivoted into its vertical blocking position in response to the urging of the plunger spring 212, because the upper edges 182a of the cam block 182 mounted on the wall 150 engage the breech block 190 so that the block is held in its horizontal position.

The cam block 182 is axially located slightly to the rear of the cam slot sloping surface 196c so that the breech block 190 is disengaged from the cam block 182 and is in a vertical position when the rollers 200 engage the sloping surface. Consequently, the breech block upper end may be received between the end of the barrel and a lug 219 depending from the rear upper edge of the ring 138. The breach block is thus locked in that position and the chamber 132 is blocked.

For detonating a round of ammunition, there is provided a hammer 224 which is pivotally mounted on the breech block pin 192 and centrally positioned within the breech block 190 in a space conforming to the shape of the hammer 224 as can be seen from FIG. 4b. The lower portion of the hammer is formed with an elongated slot 225 through which the link pin 215 extends. This causes the hammer to pivot with the breech block but permits limited pivoting of the hammer relative to the breech block. Note in FIG. 9 that when the breech block is in its open position, the hammer fits within the semi-cylindrical recess 182c in the cam block 182.

The upper end of the hammer 224 is formed with an elongated tip 224a which extends through an aperture 190a in the breech block 190. As can be seen, the aperture 190a extends completely through the breech block and the length of the hammer tip 224a is such that it extends beyond the forward surface of the breech block when the hammer is pivoted into its most extreme position.

A spring 226 mounted within a socket in the breech block 190 engages the hammer 224 to urge the hammer in a counterclockwise direction so that its tip 224a does not extend beyond the forward surface of the breech block 190. The hammer tip 224a is, of course, axially aligned with the center of a round of ammunition when the breech block is in its chamber locking position so that the hammer is able to detonate the round of ammunition.

For tripping the hammer to strike a round of ammunition against the urging of the spring 226, the hammer is formed with a tongue 224b which when the breech block 190 is in its vertical position, is depending so that when the barrel reciprocates forward, the tongue engages a tubular inertia block 230. The block 230 is slideably mounted within a housing 232 secured to the bottom wall 150 of the fixed support member by suitable fasteners 233, as illustrated in FIG. 9. The inertia block 230 is urged forwardly by a compression spring 234 confined between a socket in the forward end of the inertia block 230 and a plug 236 threadably closing the forward end of the inertia block housing 232.

(f) *Extractor*.—Also included in the breech ring assembly 14 is a cartridge extractor mechanism generally indicated at 360 in FIGS. 9 and 13. As can be seen from FIG. 9, the mechanism includes a pair of extractors 362 positioned on opposite sides of the breech ring 138, each of the extractors being provided with an inwardly extending tip 362a which fits within the groove 363a in the rear portion of a cartridge for a round of ammunition 363 schematically illustrated in FIG. 13. The extractor 362 includes a shaft 362b which extends through the sidewall of the breech ring 138, and an end 362c (FIG. 11) which extends outwardly beyond the exterior of the breech ring.

An extractor lever 366 is fixed by a pin 364 to the end 362c of the extractor shaft. As best seen from FIGS. 11 and 13, the extractor lever 366 has a somewhat flattened triangular shape with its bottom wall having a depending portion 366a at its forward edge. The extractor lever is located so that it engages the upper surface 368 of the sidewall 149 of the breech block cam 147, FIGS. 2 and 12. This upper surface 368 has a forward portion 368a which is slightly lower than a rearward portion 368b. The extractor lever 366 is vertically located such that the lever is unaffected by the forward portion 368a of the upper surface 368; however, the rearward portion 368b being slightly higher causes the extractor lever to pivot so that the forward depending edge 366a and the rear edge 366b ride on the surface 368b.

To accommodate the injection of a round of ammunition into the barrel chamber 132, the extractor 362 and its shaft 364 is radially slideable outwardly as can be visualized from FIG. 9. A detent spring 370 and a cooperating detent 372 react against the inner surface of the breech ring 138 to urge the extractor inwardly. Reaction of the extractor tip 362a with the groove in a round being injected also pivots the extractor lever 366 so that the rear edge 366b does not ride on the forward portion 368a of the upper surface 368.

(III) Drive spring assembly

Still referring to FIG. 11, on the forward end of the breech ring 138 are formed a pair of large outwardly extending ears 156 each of which has an axially extending opening 157 therethrough and a smaller vertical aperture 158. As best seen from FIGS. 1 and 2, the leading or forward portion of the breech block cam 147 is formed with a pair of massive, upwardly extending ears 160 each having an axially extending opening. The breech ring assembly 14 and the breech block cam assembly 16 are interconnected by the pair of drive spring assemblies 17 in cooperation with the ears 156 and 160.

Still referring to FIGS. 1 and 2, each drive spring assembly 17 includes a strong guide tube 162 having mounted therein rugged, compression drive springs 164 which, in the example illustrated, are formed in three sections separated by spacers 165. A bushing 166 is mounted on the tube 162 with a cylindrical portion extending into the aperture in the ear 160 on the breech block cam 147. A flange on the forward end of the bushing 166 engages the forward face of the ear 160 and the rear end of the springs 164.

The rear end of the tube 162 extends into the aperture 157 (FIG. 11) in the ear 156 of the breech ring 138 and is secured thereto by a quick-disconnect pin 168 extending through the aperture 158 in the ear 156 and through the end of the tube 162.

The springs 164 are confined on the forward end of the tube 162 by a spacer 165 backed by a suitable nut 169 and a jam nut 170 threaded onto the tube. With this arrangement, it can be seen that the guide tube 162 moves with the breech ring 138 and that the springs 164 are compressed between the ear 160 and the nut 169 when the breech ring 138 is moved rearwardly relative to the breech block cam 147.

A bushing nut 171 threaded onto the rear end of the tube 162 serves to confine the bushing 166 and the springs 164 on the tube before assembly to the gun. The nut has an outer diameter which fits within the ear 160 so that rear of the tube 162 carrying the nut 171 may be inserted into the ear 160 during assembly and then secured to the ear 156.

The forward, unsupported end of the guide tube 162 terminates adjacent to a barrel sleeve 176 which is a convenient mounting surface for various mounting enclosures that may be employed for the gun, depending upon the particular application. Also, with such enclosures, provision may be included for receiving the forward reciprocating end of the guide tube 162.

(IV) Buffer-charger assembly

Turning now to FIGS. 2 and 4c, the buffer-charger assembly 22 is attached to the rest of the gun by means of a quick-disconnect pin 240 extending through a bracket 242 of the assembly and the forward end of the plunger cap 218. The bracket 242 is threaded to the end of a recoil piston rod 244 and further secured by a retaining ring 243. The rod 244 extends into a buffer housing 246 fixed to the support 24 by means of a flange 246a (FIG. 1). The rod 244 is provided with a piston head 245 which slides within the housing slightly spaced from the housing walls, as can be seen from FIG. 4c. The rear end of the buffer housing 246 is closed by a cap 248 having a ball-type bleed valve 250 positioned within an axially extending passage. The opposite end of the buffer housing 246 is closed by another cap 254. Suitable seals 255 prevent leakage between the piston rod 244 and the caps 248 and 254.

Positioned within the buffer housing 246 on opposite sides of the piston head 245, are a pair of orifice sleeves 258a and 258b. These sleeves are formed with a tapered inner surface which decreases in diameter toward their respective ends of the housing. The housing 246 is normally filled with hydraulic fluid which must be displaced past the piston head as the head reciprocates within the buffer housing 246. The resistance to fluid flow increases as the piston head moves into the tapered section 258 so that the buffer provides increased buffering as the barrel approaches the ends of its stroke.

A plurality of Belleville springs 260 confined between the end cap 248 and a spacer 262 provide additional buffering effect. Similarly, Belleville springs 264 are confined between end cap 254 and a spacer 266 abutting the forward end of the orifice sleeve 258b.

In the event of minor leakage of hydraulic fluid from the buffer housing, a small supply of replenishing fluid is contained in the tubular rear end of the piston 244. This space 268 extends between an inner end adjacent to the piston head 245 and a replenisher piston head 270 carried on the end of the replenisher rod 272 which extends out the rear end of the piston rod 244 and is slideably received in a bushing 274 which is attached to the rear end of the buffer piston 244 by means of a suitable retaining ring 276. An O-ring 271 mounted on the replenisher piston 270 prevents leakage past the piston. A compression spring 275 between the piston 270 and the bushing 274 urges the piston forwardly.

At the forward end of the replenishing fluid chamber 268, there is formed a radially extending passage 278 in the piston head 245 which opens to the circumferential surface of the piston head so that the chamber 268 is in communication with the interior of the buffer housing 246. Consequently, when leakage occurs and additional fluid is needed within the housing, the spring 275 forces the replenishing piston rod 272 and piston head 270 forwardly so that additional fluid from chamber 268 is forced into the housing 246.

Since the passage 278 is quite small, fluid flow past the piston 245 during normal operation does not significantly affect pressure within the chamber 268. However, if pressure should increase, forcing the piston 270 rearwardly approaching its rear limit, the pressure will be relieved through a plurality of radial passages 279 permitting fluid seepage between the bracket 242 and the piston rod 244. Also, when necessary, additional fluid may be added to the fluid chamber 268 through the passages 279 by disconnecting the piston 244 from the bracket 242 and forcing the piston 270 to its rear limit.

Threaded to the forward end of the housing cap 254 is a charger housing 280. A charger piston head 282 is threaded to the forward end of piston rod 244 to slide within the charger housing 280. A compressed air inlet connection 284 is positioned in the forward end of the charger housing 280. A plurality of outlets 286 in the sidewalls of the charger housing between the charger piston 282 and the housing cap 254 permit the passage of air to and from the space between the piston head 282 and the cap 254. Consequently, in the event of a misfire, pressure applied through the connection 284 against the forward end of the piston 282, forces the piston 244 rearwardly together with the barrel and breech ring.

(V) Ammunition feed mechanism

Refer now to the ammunition feed mechanism 20 which as previously mentioned is adapted to feed ammunition from either side of the rammer assembly 18 so that the gun may be fed two different types of ammunition as desired. As can be seen from FIGS. 2, 5–7 and 19, the mechanism includes a large frame 290 which fits over the top and the two sides of the rammer assembly. The upper wall 32 of the frame mates with the upper portion of the rammer tube 26 to in effect form the upper wall for the portion of the rammer tube where a round of ammunition is inserted, as can be seen from FIGS. 2 and 4a.

Since the mechanism is symmetrical, only one side need be described in detail.

As can be seen from FIGS. 6, 7 and 19, there is a space 310 between sidewall 291 of the frame 290 and the rammer tube 26 sized to receive a belt of ammunition 312 for vertical feed movement. The rounds of ammunition 31 and 33 are carried by interconnected links 314 each having its outwardly extending edge portion 314a slideably received in a vertically extending slot 316 formed in the frame 290 on the inner side of the wall 291.

The belt of ammunition 312 is supported vertically by a pair of holding pawls 318. The rear holding pawl 318a engages the rear portion of a round of ammunition, as illustrated in FIG. 5 and in FIG. 2, while the forward holding pawl 318b engages a portion of reduced diameter on a round of ammunition as can be seen in FIG. 7. The holding pawls are pivoted to lugs 319 located on the outer sides of the wall 291 and they extend inwardly into the ammunition space 310 through openings 320 formed in the wall. The portion of the frame defining the lower wall of the openings 320 limits the downward or counter-clockwise movement of the pawls 318 so that they are held at the oblique angle illustrated in FIG. 7 to support the belt of ammunition 312. The free ends of the pawls 318 are pivotable upwardly in line with the wall 291 of the frame 290 defining the ammunition space 310 to enable the belt of ammunition to be moved upwardly. Suitable springs 322 are associated with each pawl 318 to urge the free end of the pawl downwardly and inwardly to the position illustrated in FIG. 7.

Referring to FIG. 19, flanges 293 on the sidewall 291 form a pair of opposed vertically oriented slots 292. A feed slide 294 carries on each side a pair of guides 295 which ride within the slots 292. A bottom plate 296 of the feed slide 294 is attached to the base of a feed piston rod 297 carrying a piston 298 which is confined within a cylinder 300 fixed on the wall 291. A pair of guide rods 302 extend upwardly from the bottom plate 295 with their upper ends sliding within elongated sockets 303 formed in the cylinder 300. The feed slide 294 is powered upwardly within the slots 292 by applying air pressure to the underside of piston 298, through suitable connections (not shown). Compression springs 304 surrounding the guide rods 302 urge the feed slide 294 rapidly downwardly when the air pressure is removed.

Still referring to FIG. 19 and also to FIG. 6, there is provided a pair of feed pawls 305 pivotally attached to the feed slide 294 in a recess 306 on each side of the feed slide. The inner end of the feed pawl 305 extends inwardly through a vertically oriented slot 307 formed in the sidewall 291 and into the ammunition space 310 in the path of the ammunition belt 312. A spring 308 urges the feed pawl 305 inwardly into the position illustrated. When a downward force is applied to the inner end of a feed pawl 305, its lower outer end engages the inner sidewall of the feed slide 294 so that further downward pivoting movement is prevented. However, upward movement on the pawl pivots it out of the ammunition space 310 against the urging of its spring 308.

Referring now to FIGS. 5, 7 and 19, on either side of the feed slide 294 and the adjacent frame structure there is mounted a pair of obliquely oriented cam levers 324, each having its lower end pivotally attached to the frame 290. Each cam lever 324 has a cam slot 326 which extends partially through the thickness of the lever from the feed slide side of the levers. Each cam slot has a lower portion 326a and a longer upper portion 326b, which is more vertically oriented than the lower portion when the lever 324 is at rest as illustrated in FIGS. 5 and 7.

Cam follower pins 328 carried by the feed slide guides 295 extend outwardly through vertically oriented slots 329 in the flanges 293, and into the cam slots 326 in the cam levers 324. Consequently, when the feed slide 294 reciprocates vertically, the pins 328 are moved vertically and the engagement of the pins with the cam slots 326 causes the upper end of each lower 324 to pivot inwardly.

Pivotally attached to the upper end of each cam lever 324 is a side-stripping or delinking arm 330 having an inner end 330a which is curved to conform to the curvature of a round of ammunition 31 located at the height of the rammer tube 26 but positioned outwardly from the tube, as may be seen in FIG. 7. The arm is limited in its pivotal movement in the counter-clockwise direction to the horizontal position illustrated in FIGS. 2, 5 and 7, and a spring 331 attached to the side-stripping arm 330 and the cam lever 324 urges the side-stripping arm counter-clockwise in the horizontal position. However, the side-stripping arm 330 is pivotable clockwise so that its inner end is movable upwardly through a slot 333 by a cartridge of a round of ammunition.

Since the rammer tube 26 is open on both sides, it is desirable that a round of ammunition be prevented from moving laterally out of the rammer receiver in either direction. For this purpose, there is provided a pair of positioning pawls 332 pivotally mounted to the rear upper portion of the feed mechanism frame 290 as can be seen in FIGS. 2 and 5. These pawls are pivotable about axes extending parallel to the rammer tube 26. As a round of ammunition is moved inwardly, the pawl 332 in the path of the round pivots inwardly until the round is centrally positioned. It then snaps downwardly and outwardly under a spring bias to the position illustrated in dotted lines in FIG. 5.

There is also provided a pair of positioning pawls 334 located more forward from the pawls 332 near the reduced diameter portion of a round of ammunition as illustrated in FIGS. 4a and 7. Each pawl 334 is mounted to pivot about an axis 335 which is obliquely oriented and the length of the pawl is such that the pawl 334 will pivot in a manner to cause its inner end to move both in a vertical and horizontal fashion. This is necessary since these pawls must pivot out of the transverse or lateral path of an incoming round of ammunition and out of the axial path of a round of ammunition being rammed forwardly towards the barrel. Also, each pawl 334 is provided with a suitable spring 336 urging the pawl to pivot into the holding position illustrated in FIG. 7.

In accordance with another aspect of this invention, there is schematically illustrated in FIG. 22 a pneumatic control system 337 operating the feed mechanism 20 and the charged 280, 282. As can be seen, there is included a source of pressurized air 342 with its output connected to an electrically operated trigger valve 344, which in turn leads to a trigger cylinder 346 having an output shaft 347 positioned to operate the rammer sear lever 64.

Also connected downstream from the trigger valve 344 is a feed control valve 348 which carries a sensing arm 349 that extends into the rammer tube 26. So long as the sensing arm 349 engages a round of ammunition 28, in the rammer receiver 26, the feed control valve 348 remains closed. However, if the rammer tube 26 is open or empty, the sensing arm 349 does not engage a round of ammunition and the feed control valve 348 opens.

Connected in series with the control valve 348 is a feed selector valve 350 having two outputs 351 and 352 leading to the respective sides of the ammunition feed mechanism 20. Output line 352 is shown leading to the feed cylinder 300 containing the feed piston rod 296 connected to the feed slide 294, carrying a second round of ammunition 31. When pressurized air is applied to the feed cylinder 300, the second round of ammunition 31 is moved upwardly towards the rammer tube 26. It will be understood that in the actual version of the feed mechanism as illustrated in FIGS. 5, 6 and 17 a vertically moving round of ammunition replaces another round which is transversely thrust into the rammer tube 26.

Also associated with the pneumatic control system is an outlet line 354 leading to a charger switch valve 335 which in turn has its output 356 connected to the charger housing 280 through its inlet connection 284 so that pressurized air may be applied against the charger piston 282.

(VI) Operation of the gun

While operation of the gun may be apparent from the foregoing structural description, a more thorough explanation follows. A discussion of the weapon cycle may be conveniently commenced with the breech ring assembly 14 and the spring-driven rammer member 56 seared to their rear positions as shown in FIGS. 3 and 4a. The feed mechanism 20 has deposited a round of ammunition 28 into the rammer tube 26 and the safety 76 has been moved to the fire position. Upon operating the trigger valve 344 of the pneumatic control system shown in FIG. 22, pressurized air is applied to the trigger cylinder 346 which causes the rammer sear 64 to move out of engagement with the depending lug 56d formed at the rear of the rammer 56. This starts the rammer cycle, freeing the rammer 56 to move forwardly under the impulse of its driving spring 54, and the round 28 is engaged by the pawl 58 as shown in FIG. 14.

At the forward end of its stroke, the sloping surface 56f on the rammer 56 strikes the mating sloping surface 122b of the sear plunger 122, causing it to move downwardly (FIG. 15). This action depresses the tongue 130a on the barrel sear causing the sear to pivot against the urging of the springs 186 (FIG. 12) causing the lugs 130a to be removed from the notches 188 in the breech ring 138, thereby releasing the barrel. The final forward movement of the spring-driven rammer 56 is stopped by the stack of Belleville springs 88 associated with the buffer housing 86 (FIG. 4a). The round 28 starts to leave the pawl 58 and is propelled forwardly towards the barrel under its own momentum pivoting the case or cartridge deflector 38 forwardly out of the way.

As the barrel sear 130 is depressed by the rammer cylindrical member 56 through the sear plunger 122, the breech ring assembly 14 and the barrel assembly 12 begin to move forward under the impulse of the drive springs 164, thus starting the firing cycle. During this forward travel, the breech block 190 slides forwardly beyond the cam block 182 and is then free to pivot about the breech block pin 215 due to the force of the plunger spring 212 upon the breech block acting through the piston 208 and the link 214. As shown in FIG. 16, the breech block is almost pivoted to a position wherein it obstructs or closes the barrel chamber 132. The round 28 has, of course, already entered the chamber.

Further forward motion causes the breech block 190 to move upward, finally chambering the round and locking the breech block, as shown in FIG. 17. This upward motion is accomplished by the breech block pin 192 and its rollers 200 following the path of the cam slots 196. More specifically, the rollers move from the rear portion 196a up the sloping portion 196c to the upper forward portion 196b of the cam slots. The upper portion of the breech block 190 thus moves in front of the depending lug 219 on the breech ring so that the block is locked in position closing the barrel chamber 132. It should be noted from FIG. 16 that the breech block has not moved upwardly by the cam slots 196 and that the breech block has been released by the cam block 182 so that it is pivoting out of its horizontal position into its vertical or blocking position.

The hammer 224 moves with the breech block 190. Just after final locking of the breech block, the tongue 224b of the hammer 224 strikes the spring-biased or yieldable inertia block 230, pivoting the hammer about the breech pin 215 as permitted by the elongated slot 225 and driving the forward tip 224a of the hammer forwardly to sharply strike the primer of the chambered round, as shown in FIG. 17, thereby causing ignition. The shell 29 leaves the cartridge 28a and speeds forward.

The barrel assembly 12 and the breech assembly 14 continue to travel forward a short distance due to their momentum and the continued urging of the drive springs 164 until the recoil force caused by ignition of the round overcomes the forward momentum and reverses the direction of movement. As the recoiling parts now move rearward, the breech block rollers 200 along with the breech block pin 192 and the breech block 190 follow the breech block cam slots 196 downward, drawing the breech block out of its locking recess in front of the lug 219 on the breech ring 138 and unlocking is accomplished, as shown in FIG. 18. The complete unlocking time has been arranged to minimize chamber gas leakage and to provide sufficient residual force to properly eject the expended case 28a.

With the recoiling parts moving to the rear just after the instant of the unlocking of the breech block 190, the extractor levers forward portions 366a engage the sloping surface 368c of the breech block cam assembly support member, causing the levers to pivot quickly, together with the extractors 362 (FIGS. 9 and 13). This movement of the extractors gives an initial sharp extraction force to the cartridge case through the annular groove 28b formed on the case of 28a of FIG. 17, should it be needed. However, it should be noted that mechanical extraction is normally not required since the use of the fluted chamber 132 allows the cartridge case to be ejected easily from the barrel.

The breech block 190 now begins to pivot open, first by the gas pressure acting on the cartridge head and then by its lower end striking the cam block 182, which action cams the breech block 190 to its horizontal or full open position and compresses the plunger spring 212. Once the breech block 190 has pivoted out of the way, the cartridge case 28a is blown clear of the chamber 132, past the breech block 190, and it strikes the case deflector 38 which deflects the case upwardly through the outlet 27 clear of the weapon, as illustrated in FIG. 18.

As the recoiling parts near the end of their rearward movement, they are first slowed and then stopped by the action of the buffer assembly 22. The buffer piston 244 is also moved rearwardly within the fixed buffer housing 246, as seen in FIG. 4c. Normal buffer operation is accomplished by the buffer piston approaching the rear tapered sleeve 258a in the buffer housing. This tapered sleeve 258a forms a variable area orifice with the area decreasing in the direction of travel of the piston so that hydraulic fluid is throttled around this area. Extra buffer capacity is provided by the stack of Belleville springs 260 in the event this is necessary. Note that the rod 272 can extend into the inertia block housing plug 236.

It should be mentioned at this point, that buffering on the forward stroke is provided by the tapered sleeve 258b within the buffer housing 246 in the same manner described above. This is necessary in the event of a misfire where a round does not fire when struck by the hammer, or in the event the breech block is closed on an empty chamber.

It should also be noted that during the central portion of the stroke of the buffer piston 244 in its housing 246, the area between the piston and the housing forms a velocity sensitive constant area orifice which limits the maximum velocity of the recoiling parts.

As explained above, the breech ring assembly 14 is connected to the rammer assembly 18 through the connectors 104 so that the ramming and firing cycles overlap. Forward movement of the breech ring assembly 14 and the barrel assembly 12 at the beginning of the firing cycles moves the lower rack 96 of the rammer assembly 18 forward and this motion is transmitted to the upper rack 110 through the small pinion 106 and the large pinion 108. Forward motion of the lower rack 96 produces rearward motion of the upper rack 110 which carries the rammer 56 rearward through the engagement of its latch 114 with the depending lug 56e, as seen in FIG. 16. This in turn compresses the rammer spring 54.

As the breech ring assembly 14 and the barrel assembly 12 reach the forwardmost position and their movement is reversed, so is the movement of the upper rack 110. The ramming cycle is now complete; and if not seared, the rammer 56 will move forward carrying with it the next round 31 (FIG. 17). However, since the upper rack 110 and the rammer 56 remain connected by the latch 114, the rammer is restrained. At this point, the barrel is recoiling at approximately its maximum rearward velocity and the rammer latch 114 strikes the release latch 118 and the rammer 56 and its spring 54 are freed to ram or propel the next round 31 toward the chamber 132, as shown in FIG. 18. Arranging the components to provide this timing relation insures that a second round is not propelled by the rammer until the previous round has properly fired.

At the end of its forward stroke, the rammer cylindrical member 56 again depresses the breech ring sear 130 through the sear plunger 122. As the barrel assembly 12 and breech ring assembly 14 reach the end of their rearward stroke and encounter the resisting action of the buffer assembly 22, the firing cycle is complete. Since the recoiling parts find the sear 130 depressed, they once more begin moving forward to start the next firing cycle under the urging of the drive springs 164 which were placed under tension by the recoiling rearward movement of the barrel assembly 12 and the breech ring assembly 14. This forward motion imparts a rearward motion to the upper rack 110 which has attached itself to the rammer 56 by the latch 114 so that the rammer is drawn rearwardly with it, as in FIG. 16. While the barrel and breech ring assemblies are moving forwardly on the second firing cycle, the second round 31 having left the rammer 56 is being propelled towards the barrel chamber 132 under its own momentum.

The second round was started automatically into the rammer tube 26 as soon as the sensing arm 349 of the feed control valve 348 (FIG. 22) sensed that the tube had space for the second round. The pressurized air through the control valve 348 flows through line 352 to the feed slide cylinder 300, as determined by the manually controlled feed selector valve 350.

Air pressure applied to the underside of the feed slide piston 298 powers the feed slide 294 quickly upwardly carrying the cam pins 328 and the feed pawls 305. The vertical movement of the pins 328 in the lower cam slot portions 326a causes the cam levers 324 to pivot inwardly which in turn causes the side-stripping arm 330 to move inwardly. This side thrust strips a round 31 of ammunition from a link 314 and urges the round toward the rammer receiver 26, FIG. 20. The succeeding round 33 being moved upwardly by the pawl 305 also tends to move the round 31 into the rammer receiver after it has been delinked or stripped from its link, FIG. 21. Note that the rammer drive pawl 58 (FIG. 16) deflects forwardly to permit its rearward movement with a round of ammunition in the tube 26.

The angle of the lower slot portion 326a is such that the delinking operation is completed in the short time that it takes the follower pin to move from its lowest position to the upper end of the lower slot portion 326a. When the follower pin has reached the juncture between the upper and lower slot portions, the upper portion 326b, extends approximately vertical or parallel to the movement of the feed slide 294 and its pins 328 so that the continued upward movement of the feed slide and its pins causes no further inward movement of the side-stripping arms. The continued upward movement does however lift the round 33 into position adjacent to the rammer tube, the side-stripping arms 330 pivoting upwardly due to the upward movement of the ammunition belt, FIG. 21. The subsequent downward movement of the feed slide and its follower pins causes the levers 324 and the side-stripping arms 330 to return to the position illustrated in FIGS. 5 and 7.

As a round of ammunition is moved into the rammer tube, the link 314 which was carrying that round continues to move upwardly out of the feed mechanism. The connections between the links are arranged such that the links are separated as they are ejected from the feed mechanism.

The gun cycle of operation will continue to be repeated as long as the trigger valve 344 is operated and ammunition is delivered by the feed mechanism 20 into the rammer assembly 18. When the trigger valve is released, the compressed air supply to the trigger cylinder 346 shown in FIG. 22 is terminated and the rammer sear 64 moves by the force of its spring 72 to engage and hold the rammer through its depending lug 56d when it is next drawn to the rear. With the rammer 56 seared, the round in the chamber 132 fires and causes the barrel and breech ring assemblies to recoil to the rear where the sear lever 130, now free, engages and holds them, stopping the cycle.

If it is desired that ammunition of a different type from the other side of the dual feed mechanism be fed into the rammer assembly, it is only necessary to actuate the feed selector switch 350 in FIG. 22 to connect fluid pressure from the air supply 342 to drive the other side of the feed mechanism.

Since a round of ammunition will normally be in the rammer assembly, the first round fired after actuation of the selector switch 350 will be the round in the rammer which is from the first side of the feed mechanism. If desired, this one round can be manually removed from the rear of the rammer receiver 26 (FIG. 4a) by depressing the pawls 58 and 34 and forcing the round to the rear.

Should a round of ammunition fail to fire, the breech ring assembly 14 and barrel assembly 12 would move forward beyond the firing position, strike the buffer assembly 22 and stop. To clear the weapon, the operator could supply air from the source 342 to the charger cylinder or housing 280 shown in FIG. 4c. The force thus applied to the buffer piston 244 through the charger piston 282 will drive the barrel assembly 12 and the breech ring assembly 14 to the rear, opening the breech block and mechanically ejecting the misfired round, and searing the breech ring 138. Firing can then be resumed by operating the trigger valve 344 in a normal fashion.

From the foregoing description, it will be appreciated that one of the virtues of this invention is that the ramming cycle overlaps the firing cycle, including ejection, so that high speed operation is attained. Hence, a round of ammunition is being propelled or rammed towards the barrel before the previous round has been ejected from the barrel.

Another feature of the gun of the invention is that trunnion forces, or forces on the structure supporting the gun, are minimized since the gun is fired while the barrel assembly is still moving forward in counter recoil. Therefore, the recoiling force produced by the exploding round must first overcome the counter recoiling force from the preceding round as produced by the drive springs 164. Or stated differently, the force is kept low because the velocity of the massive barrel is kept low.

Naturally, the forward velocity of the barrel and breech ring assemblies is dependent on the characteristic of the drive springs. In theory, the drive springs should be selected so that, at the instant of firing, the barrel will be accelerated in counter recoil to a velocity about half that of the free recoil velocity of the barrel and breech ring so that about half of the recoil force is consumed in stopping the forward moving barrel and the other half is received by the springs. Free recoil velocity is defined as the maximum velocity the barrel and breech ring assembly would reach if at rest when fired and if unresisted in recoil. This may of course be computed since the mass of the shell times the velocity of the shell is equal to the mass of the recoiling parts times their velocity.

An illustration of the overlapping ramming and firing cycles and the velocities involved may be seen from the schematic diagram of FIG. 23, wherein the velocity of the components is plotted on the vertical or ordinate scale in feet per second while the time in milliseconds is shown as the abscissa or horizontal scale of the graph. It should be understood that the values involved are exemplary only and for a 35 mm. version of the gun. The recoil velocity is illustrated above the abscissa as comparable to the rearward movement of the components, while the counter recoil velocity or forward movement of the components is indicated below the abscissa.

It is assumed that the gun is being started from a rest position 400 as described above wherein the rammer and the barrel are seared. To start the cycle, the rammer sear is released and the rammer is accelerated forward at a velocity represented by curve 402 on the graph. During the first section 402a of the cycle, the rammer is accelerated to a velocity of approximately 29.5 feet per second after approximately 28.5 ms. as determined by the characteristics of the rammer spring. This is indicated by the point 404 on curve 402. At that point, the rammer is quickly buffered as indicated by section 402b of the curve and the barrel sear is released by the rammer. The barrel and breech ring assemblies are thus driven forward from point 405 by the drive springs, as can be seen by section 406a of the solid line 406. The movement of the rammer 56 is reversed at point 405 by virtue of its connection to the barrel through the rack and pinion mechanism 94, as shown by graph section 402c.

The barrel moves forwardly for approximately 60 ms. until slightly after the instant of fire at 408, approximately 87.5 ms. from the release of the rammer. As shown by the dashed line 410, the rammed round after having left the rammer at point 404 continues forward at a substantially constant velocity, causing it to overtake the barrel and become completely chambered after approximately 83 ms. from the start of the cycle shown at 412, which is close to the maximum forward velocity point 408 at the instant of fire. In the example given, the barrel and breech assemblies attain a velocity of approximately 7.5 feet per second while moving forward. While the barrel is moving forward, the rammer being connected to the barrel through the 1.77 to 1 gear ratio attains a rearward or recoil velocity of approximately 13.3 feet per second after about 88 ms. have elapsed, as seen at point 414 on curve 402c.

After the instant fire, the exploding round produces a recoil force which within a few milliseconds overcomes the forward force of the barrel and propels the barrel rearwardly as shown by section 406b of the curve 406. The barrel reaches its maximum velocity of approximately 11.5 feet per second, as seen at 416. The reversal of direction of the barrel naturally causes the rammer to accelerate as at curve section 402d and reverse direction in view of their interconnection for the start of a new ramming cycle as represented by curve section 402e.

Note that the rammer hook or latch 114 is released by contact with the latch release 118 at approximately point 418 on the curve 402c which is just after the barrel has reached its maximum recoil velocity. This insures that a second round of ammunition is not released from the rammer unless the previous round has been fired; i.e., there has been no misfire.

After 100 ms. from the start of the cycle, the breech block 190 is completely unlocked, as shown by point 420 on curve section 406c, and the cartrdige case of the fired round is commenced to be ejected as indicated by the dotted line 422. The barrel continues to recoil rearwardly until at point 424, after approximately 135 ms., the cycle is complete and may be repeated. This time, however, includes portions of two ramming cycles and the actual time for the firing of a round is about 108 ms. for the example given, as may be seen from the point 405 where the barrel sear is released to the point 424 where it has returned to its seared position.

The rammer in the meantime has reached its maximum velocity at 426 on graph 402 where it is quickly stopped by the buffer housing 86 and springs 88, as indicated by curve section 402f. Since the barrel movement is not reversed for several more milliseconds, the rammer remains at rest in its forward position depressing the barrel sear, which is represented at section 402g on the curve. The second round continues forward from point 426, as seen at 428, to be chambered in the barrel released at point 424.

During continued firing of the gun, the rammer will normally remain at rest for about 13 ms. waiting for the recoiling barrel as shown by curve 402g. However, with the first cycle, the rammer started with the barrel seared. Thus, the normal cycle for continued operation of the rammer extends from point 405 to 424.

In view of the overlapping of the ramming cycle with the firing cycle, the ammunition feed mechanism 20 has in accordance with another aspect of the invention been arranged to provide ammunition to the rammer at a cycle rate equal to or faster than that of the gun. As can be realized from the diagram of FIG. 24, a round of ammunition must be fed to the rammer tube 26 while the barrel is moving forwardly and the rammer is moving rearwardly. Since the ammunition for which this gun is primarly designed, such as 35 mm. ammunition, is quite heavy, the feed mechanism is constructed so that the sideways movement of a round of ammunition during which it is delinked from its link in the belt of ammunition takes place in a very short interval of time while most of the remaining cycle time is available to lift the heavy belt of ammunition upwardly one round. Thus, as has been explained, during the upward movement of the ammunition feed slide 294, the delinking of a round of ammunition is completed during the initial movement of the feed slide by virtue of the relationship of the cam slots 326 in the cam levers attached to the side-stripping or delinking arms 330.

The displacement of a round of ammunition with respect to time with the feed mechanism of the invention may be better appreciated by reference to FIG. 24 graphically illustrating the operation. As can be seen, the displacement of the belt of ammunition in inches is indicated on the vertical or ordinate scale of the graph while time in milliseconds is indicated on the horizontal or abscissa scale of the graph. Due to the space occupied by a round of ammunition and the interconnecting links, a total of approximately 3½ inches of vertical displacement of the feed slide 294 is required for one cycle of the feed mechanism.

The zero time point 431 on the graph is that at which compressed air is first applied to the feed slide cylinder 300. The initial movement of the feed slide causes the pin 328 to engage the lower portion of the cam slot in the cam lever 324. This action causes the lever to pivot so that the side-stripping or delinking arm 330 is moved inwardly. As can be seen at 430 from section 432a of the graph 432 of FIG. 24, after the feed slide has moved upwardly only about 3/10 of an inch, and after about 10 ms. have elapsed, the side-stripping arm 330 has been moved inwardly a sufficient amount to delink a round of ammunition from its link 314.

After approximately 15 ms. have elapsed, and the feed slide has moved up about ½ inch, the vertical movement of the ammunition belt is commenced as indicated at 434 on the graph. After a total of approximately 25 ms. have elapsed, and the feed slide has been moved approximately 8/10 of an inch upwardly, as indicated at 436 on the graph, the side-stripping of a round of ammunition has been completed and the round is now positioned within the rammer assembly. Thus, it can be seen from FIGS. 23 and 24 that there is time for this operation during the rearward movement of the rammer, after there is space within the rammer receiver, as sensed by the feed control valve 348, FIG. 22.

The belt of ammunition continues upwardly at a slightly increased velocity as indicated by section 432b of the graph, and is completely indexed upwardly one round after the feed slide has moved 3.5 inches and approximately 75 ms. have elapsed as may be seen at 438. Since the sideways movement of a round overlaps only slightly with the vertical movement of the belt, the force requirement of the control system is minimized.

The total time from point 434 to 438 during which the belt of ammunition is moved upwardly one cycle, which is about 3 inches, is about 60 ms., and the total time for the upward vertical movement of the feed slide is about 75 ms. The feed slide return time in response to the urging of the springs 304 is approximately 25 ms., extending from point 438 to 440 on graph section 432c. It should be noted that the entire feed cycle time as indicated by the graph is 100 ms. which is 8 ms. less than the total cycle time for firing a round of ammunition. This 8 ms. difference provides sufficient margin of safety to insure proper feeding operations for the gun.

In general, the gun is constructed to provide ease of assembly and disassembly by using quick-disconnect pins to join different assemblies. Thus, as pointed out in FIG. 4a, the back plate assembly 48 is connected by two pins 51 to the rammer housing walls 44 and 45. Similarly, the spring assemblies 17 are connected to the breech ring assembly 14 by pins 168 as seen in FIGS. 2 and 10. Also, the connecting bars 104 are joined to the lower rack member 96 of the rammer assembly by a quick-disconnect pin 100 as seen in FIG. 4a.

What is claimed is:

1. A recoil operated automatic gun comprising:
   a support;
   a barrel slideably mounted to axially reciprocate within said support, said barrel having a chamber in its rear portion for receiving a round of ammunition;
   drive spring means connected to said barrel and said support receiving recoil forces from said barrel and providing counter recoil forces driving said barrel forwardly;
   a rammer assembly located to the rear of said barrel for receiving a round of ammunition and for propelling the round forwardly into said barrel chamber;
   a breech assembly including breech block means movable relative to the barrel for locking a round of ammunition within the barrel chamber, detonating the round, and unlocking the barrel chamber, to permit ejection of the cartridge of the spent round of ammunition and to permit insertion of a second round of ammunition;
   means interconnecting said rammer assembly and said breech assembly for causing the second round of ammunition to be propelled forwardly by the rammer assembly before the cartridge of the spent first round of ammunition clears the barrel;
   said breech assembly including a breech ring attached to the rear of said barrel; and
   a barrel sear mounted on said support for engaging said breech ring to hold said barrel in its rearward position, said barrel sear being unlatched to release said barrel by said rammer assembly as a round of ammunition is propelled forwardly toward said barrel chamber.

2. The gun of claim 1 wherein said barrel sear comprises a spring loaded pivotally mounted lever which is depressed by the movement of said rammer assembly to release said barrel.

3. The gun of claim 1 wherein said rammer assembly includes
   a spring driven rammer for propelling a round of ammunition forwardly,
   a sear plunger mounted for vertical movement in the forward end of said rammer assembly and urged upwardly in the path of said rammer, said sear plunger having a rearwardly facing surface engageable by said rammer causing the plunger to be depressed by horizontal movement of said rammer, said sear plunger being located to release said barrel sear upon being depressed so that as a round of ammunition is propelled forwardly by said rammer into said barrel the barrel is released and propelled forward in response to said drive spring means.

4. A recoil operated automatic gun comprising:
a support;
a barrel slideably mounted to axially reciprocate within said support, said barrel having a chamber in its rear portion for receiving a round of ammunition;
drive spring means connected to said barrel and said support receiving recoil forces from said barrel and providing counter recoil forces driving said barrel forwardly;
a rammer assembly located to the rear of said barrel for receiving a round of ammunition and for propelling the round forwardly into said barrel chamber, said rammer assembly includes a spring driven rammer and means for cocking said spring driven rammer in response to forward movement of said barrel including a latch for engaging said rammer and latch release means in the forward path of said latch for releasing said latch to permit a round of ammunition to be propelled forwardly into said chamber, said latch release means being located such that said latch is released when said barrel is recoiling;
a breech assembly including breech block means movable relative to the barrel for locking a round of ammunition within the barrel chamber, detonating the round, and unlocking the barrel chamber, to permit ejection of the cartridge of the spent round of ammunition and to permit insertion of a second round of ammunition; and
a deflector mounted between the rammer assembly and the barrel for movement between a position in the path of the second round being propelled forwardly by the rammer to deflect the ejected cartridge of the first round and a position out of the path of the second round being propelled forwardly by the rammer to permit passage of said round.

5. The gun of claim 4 wherein said latch means comprises a spring-biased pivotally mounted element which engages a depending hook on said rammer, said latch element being inter-connected to said barrel to move rearwardly as said barrel moves forwardly and to move forwardly as said barrel moves rearwardly, and said unlatching means includes a spring-biased pivotally mounted element situated to release said latch means when engaged by said latch means in its forward movement.

6. A recoil operated automatic gun comprising:
a support;
a barrel slideably mounted to axially reciprocate within said support, said barrel having a chamber in its rear portion for receiving a round of ammunition;
drive spring means connected to said barrel and said support receiving recoil forces from said barrel and providing counter recoil forces driving said barrel forwardly;
a rammer assembly located to the rear of said barrel for receiving a round of ammunition and for propelling the round forwardly into said barrel chamber;
a breech assembly including breech block means movable relative to the barrel for locking a round of ammunition within the barrel chamber, a detonating the round, and unlocking the barrel chamber, to permit ejection of the cartridge of the spent round of ammunition and to permit insertion of a second round of ammunition;
a deflector mounted between the rammer assembly and the barrel for movement between a position in the path of the second round being propelled forwardly by the rammer to deflect the ejected cartridge of the first round and a position out of the path of the second round being propelled forwardly by the rammer to permit passage of said round;

means for causing the second round of ammunition to be propelled forwardly by the rammer assembly before the cartridge of the spent first round of ammunition clears the barrel;
said rammer assembly including a receiver for receiving a round of ammunition and a rammer for urging the round forwardly, the forward upper end of said receiver being spaced from said breech assembly to define an outlet between said breech assembly and said rammer receiver through which a cartridge of a round of ammunition may be ejected; and
said deflector being pivotally attached to the upper wall of said rammer receiver and spring biased to extend across the forward end of said rammer receiver at an oblique angle with respect to the movement of said barrel;
said deflector being pivotable upwardly by a round of ammunition propelled forwardly by said rammer the oblique forward surface of said deflector being in the path of the cartridge of a spent round of ammunition being thrust rearwardly after detonation to thereby cause the cartridge to be deflected upwardly out of said outlet, the timing of the operation being such that the deflector is pivotally upwardly by a round of ammunition just after a spent cartridge is deflected by the deflector.

7. A recoil operated automatic gun comprising:
a barrel slideably mounted to axially reciprocate within said support, said barrel having a chamber in its rear portion for receiving a round of ammunition;
a deflector mounted between the rammer assembly and the barrel for movement between a position in the path of the second round being propelled forwardly by the rammer to deflect the ejected cartridges of the first round and a position out of the path of the second round being propelled forwardly by the rammer to permit passage of said round; and
means for causing the second round of ammunition to be propelled forwardly by the rammer assembly as the barrel is moving rearwardly;
said rammer assembly including an ammunition receiver having an opening in its side wall through which a round of ammunition may be fed sideways into the receiver and said gun includes an ammunition feed mechanism comprising:
    a frame mounted on said rammer assembly adjacent to said opening including vertically slideable feed means for receiving and guiding a belt of ammunition rounds joined by interconnected links;
    power means for reciprocating said slideable feed means vertically to elevate said belt of ammunition one round at a time;
    side-stripping means for de-linking a round of ammunition aligned with said opening by thrusting the round sideways into the opening; and
    means connecting said slideable feed means to said side-stripping means for causing initial upward movement of said feed means to operate said side-stripping means.

8. A recoil operated automatic gun comprising:
a support;
a barrel slideably mounted to axially reciprocate within said support, said barrel having a chamber in its rear portion for receiving a round of ammunition;
drive spring means connected to said barrel and said support receiving recoil forces from said barrel forwardly; and
a buffer assembly connected to said barrel for damping the movement of the barrel, said buffer assembly including a hydraulic cylinder attached to a fixed support, a piston slideably mounted within said cylinder on a recoil piston rod attached to said barrel, end caps sealing the piston within the cylinder, and a charger housing attached to one end of said cylinder, said piston rod extending through one of said end caps into said housing, a charger piston attached to said piston and slideably mounted with said housing, and a fluid connection in said housing for applying pressurized fluid to the housing to move said charger piston and drive said barrel rearwardly in the event of a misfire.

9. The gun of claim 8 wherein said piston rod has a tubular end portion and a replenisher piston and piston rod mounted within said tubular end portion with said replenisher piston rod extending out of the open end of said tubular portion,
a bushing surrounding said replenisher piston rod and fixed to the open end of said tubular portion, a replenisher compression spring surrounding said replenisher piston rod and extending between said bushing and said replenisher piston rod, said piston having an opening in its circumferential surface in communication with said tubular end portion.

10. A recoil operated automatic gun comprising:
a support;
a barrel slideably mounted to axially reciprocate within said support, said barrel having a chamber in its rear portion for receiving a round of ammunition;
drive spring means connected to said barrel and said support receiving recoil forces from said barrel and providing counter recoil forces driving said barrel forwardly;
means for ramming a round of ammunition into the barrel chamber and detonating the round when said barrel is moving forwardly under the impulse of said drive spring means, and
a buffer assembly connected to said barrel for damping the movement of the barrel, said buffer assembly including a buffer cylinder, to be attached to a fixed support, a piston slideably mounted within said cylinder on a recoil piston rod attached to said barrel, means defining a pair of tapered sections within the cylinder on opposite sides of said piston resulting in a gradually decreasing diameter of the cylinder as said piston moves into a tapered section so that the fluid resistance to the movement of said piston increases, a plurality of resilient members located between said tapered sections and the ends of said cylinder for further damping the movement of said piston in the event that the action of said tapered sections does not satisfactorily stop movement of the piston.

11. In an automatic gun,
a breech block cam assembly;
a barrel mounted to axially reciprocate within said breech block cam assembly, said barrel having a chamber in its rear portion for receiving a round of ammunition;
drive spring means connected to said barrel and said breech block cam assembly receiving recoil forces from said barrel and providing counter recoil forces driving said barrel forwardly;
a breech assembly cooperating with said breech block cam assembly for locking a round of ammunition within the barrel chamber, detonating the round and unlocking the barrel chamber to permit ejection of the cartridge of the spent round of ammunition wherein said breech assembly includes a breech ring attached to the rear of said barrel;
a breech block movably attached to said ring to open and close the barrel chamber; and
a hammer pivotally mounted with respect to said breech block, said breech block having an aperture through which an elongated portion of said hammer can extend, a hammer spring extending between said hammer and said breech block urging said hammer out of the aperture in said breech block; and including tripping means mounted in the forward path of the lower end of said hammer for causing said hammer to pivot against the urging of said hammer spring and causing said elongated portion to extend through said aperture.

12. In an automatic gun,
a breech block cam assembly;
a barrel mounted to axially reciprocate within said breech block cam assembly, said barrel having a chamber in its rear portion for receiving a round of ammunition;
drive spring means connected to said barrel and said breech block cam assembly receiving recoil forces from said barrel and providing counter recoil forces driving said barrel forwardly;
a breech assembly cooperating with said breech block cam assembly for locking a round of ammunition within the barrel chamber, detonating the round and unlocking the barrel chamber to permit ejection of the cartridge of the spent round of ammunition;
said breech block cam assembly including a support having sidewalls with opposing elongated cam slots adjacent the sidewalls of said breech member;
said breech assembly including a breech ring attached to the rear of the barrel;
a breech block pivotally mounted on a pin supported by the breach ring;
a roller mounted on each end of said breech block pin riding within said cam slots;
said cam slots including a horizontally extending lower rear portion connected by a sloping central portion to a horizontally extending upper forward portion whereby said rollers and consequently said breech block are moved up or down as the rollers move between the upper and lower cam slot portions;
said breech ring having vertically elongated openings for said pin to permit said breech block and pin to move vertically;
said breech block being in a barrel obstructing position to completely close the end of said barrel when said rollers are in the upper forward position of said slots and said breech ring having a locking surface engaging a rear surface of said breech block to lock the block in its barrel closing position;
said central portion being located so that the breech block is moved in front of said locking surface as the rollers move to the upper portion of said cam slots.

13. The gun of claim 12 wherein said breech block cam assembly includes a cam block located such that the lower end of said breech block engages said cam block, after said breech block has been unlocked from said locking surface by said rollers moving into said lower cam slot portions, to force said breech block to pivot into an unobstructing position.

14. An automatic gun comprising:
a barrel having a chamber for receiving a round of ammunition;
a rammer located to the rear of said barrel for engaging a round of ammunition and for propelling the round forwardly to said barrel chamber;
breech block means movable relative to said barrel for locking a round of ammunition within the barrel chamber, detonating the round, and unlocking the barrel chamber to permit ejection of the spent round of ammunition;
means for causing the rammer to propel the second round toward the barrel chamber before the cartridge of the spent first round clears the chamber;
a breech member attached to the rear of the barrel;
extractor means located on opposite sides of said breech member comprising;
extractors located within the member to engage opposite sides of the rear end of the cartridge of a round of ammunition to provide an ejection force on the cartridge and including shaft means extending through said ring, and
extractor levers located on the outside of the ring;
and a breech block cam which slideably supports said breech ring and barrel, said breech block cam having cam surfaces for actuating said extractor levers as said barrel recoils, said cam surfaces being located to actuate said extractor means just after said breech block means has been unlocked from its barrel closing position.

15. An automatic gun comprising:
a barrel having a chamber for receiving a round of ammunition;
a rammer located to the rear of said barrel for engaging a round of ammunition and for propelling the round forwardly to said barrel chamber;
breech block means movable relative to said barrel for locking a round of ammunition within the barrel chamber, detonating the round, and unlocking the barrel chamber to permit ejection of the spent round of ammunition;
means for causing the rammer to propel the second round toward the barrel chamber before the cartridge of the spent first round clears the chamber;
a tube adjacent said rammer having an opening in its sidewall through which a round of ammunition may be fed sideways into the tube; and
an ammunition feed mechanism operating independently from barrel movement for automatically feeding a round into said tube through said opening whenever said tube has space to receive a round.

16. The gun of claim 15 including a fluid control system for energizing said feed mechanism comprising:
a source of pressurized fluid connected to operate said feed means, a trigger valve for manually controlling the application of pressurized fluid to said feed means, and a feed control sensing valve for controlling the supply of fluid to said feed means in response to the presence or absence of a round of ammunition in said rammer tube such that said sensing valve is opened whenever the tube is open to receive a new round of ammunition from the feed mechanism.

17. The gun of claim 16 wherein said feed mechanism includes means for feeding ammuintion into said rammer assembly from opposite sides of the assembly, and said control system includes a feed selector valve for electively applying said pressurized fluid to the feeding means on either side of said rammer assembly.

18. In automatic gun, a rammer assembly for propelling a round of ammunition into the gun barrel including:
a rammer tube for receiving a round of ammunition positioned to the rear of and axially aligned with the barrel, said tube having an elongated slot formed in its lower surface;
a generally U-shaped housing positioned beneath said rammer tube;
a rammer rod attached to said housing and extending within said housing beneath said slot;
rammer spring means positioned around said rod;
a cylindrical rammer surounding the forward end of said rammer spring means urges said rammer forwardly; and
a pawl attached to the rear of said rammer and extending upwardly through said slot into said rammer tube for engaging the end of a round of ammunition placed within the rammer tube.

19. The gun of claim 18 including gear means located within said rammer assembly housing beneath said rammer spring and said rammer with said gear means being interconnected to said barrel so that said rammer is moved rearwardly to load said rammer spring upon forward movement of said barrel.

20. The gun of claim 18 including:
a lower rack slideably mounted in the bottom of said U-shaped housing with gear teeth formed on its upper surface, the forward end of said rack being interconnected to said barrel to move with the barrel,
a first pinion gear mounted on a shaft extending across said housing and cooperating with the teeth on said lower rack,
a second pinion gear mounted on said shaft to rotate with said first pinion gear having a diameter greater than that of said first pinion gear,
an upper rack having teeth on its lower surface engaging said larger pinion gear and being mounted for slideable reciprocal movement within said housing to move opposite to said barrel,
a latch secured to the forward end of said upper rack for engaging a depending hook near the forward end of said rammer, said rammer being moved rearwardly with said upper rack to load said rammer spring.

21. The gun of claim 20 wherein said rack latch is urged by a spring into position to engage said rammer hook, said rack latch being provided with a depending tongue,
and including a spring biased release latch positioned in the path of said rack latch tongue so that said release latch trips said rack latch against the urging of the rack latch spring as said rammer is being urged forwardly under the force of said rammer spring.

22. The gun of claim 18 including a back plate attached to said housing, said rammer rod being attached to said back plate and extending forwardly therefrom, and rammer sear means pivotally mounted to said back plate to engage a depending lug on the rear of said rammer for holding said rammer in its rearward position with the rammer spring loaded.

23. The gun of claim 22 wherein said back plate is attached to said housing by quick-disconnect pins extending through said sidewalls of said housing and through said plate.

24. The gun of claim 18 wherein said pawl is mounted to pivot about a transverse axis, said pawl being spring-biased to be deflected downwardly by a round of ammunition in said tube as said rammer is moving rearwardly.

25. A large caliber rapid firing recoil operated automatic gun comprising:
a barrel having a chamber in its rear portion for receiving a round of ammunition;
a breech ring assembly including a breech ring securely attached to the rear of said barrel, a breech block mounted on a pin extending across said ring and having a pair of rollers mounted on the ends of said pin, said breech block being pivotable about said pin to open and close the rear entry to said chamber, a spring connected to urge said breech block to close the chamber, a hammer pivotably mounted on said pin and having a forward tip which extends through an aperture in said breech block and a depending tongue;
a breech block cam assembly including a generally U-shaped breech block cam having a pair of inwardly extending tracks positioned on its sidewalls for slideably receiving said breech ring, a pair of cam slots formed in the sidewalls of said breech block cam and receiving said breech block rollers, said cam slots having a rear, lower horizontal portion and a forward higher horizontal portion connected by a sloping intermediate portion for raising and lower said cam block as the breech ring reciprocates within said breech block cam, a cam block secured to the rear portion of said breech block cam to pivot said breech block into its barrel open position when said barrel is near the rear of its reciprocating stroke, an inertia block secured to the forward portion of said breech block cam to engage a depending tongue of said hammer as said barrel is moving forwardly to pivot the hammer causing its tip to extend through said breech block aperture to strike the end of a round of ammunition;
drive-spring means connected to said breech ring and said breech block cam for receiving recoil forces from said barrel and providing counter recoil forces driving said barrel forwardly;

27 a rammer assembly located to the rear of said breech block cam and including a tube axially aligned with said barrel for receiving a round of ammunition, a spring-driven rammer located beneath said tube for propelling a round forwardly into said barrel chamber; and means connecting said spring-driven rammer to said breech ring for causing said rammer to be operated by movement of the breech ring and the barrel.

26. The gun of claim 25 wherein said rammer assembly includes a rack and pinion mechanism for operating said rammer, said mechanism having a lower rack slideably mounted in said rammer assembly and having its forward end connected by said connecting means to said breech ring, a small pinion mounted in said rammer assembly cooperating with teeth formed on the upper surface of said lower rack, a large pinion mounted to rotate with the smaller pinion, an upper rack slideably mounted in said rammer assembly having gear teeth on its lower surface cooperating with said larger pinion, and a latch pivotably mounted to the forward end of said upper rack to engage a hook depending from said rammer for moving the rammer to the rear against the urging of its spring; and including an ammunition feed mechanism mounted on said rammer for feeding ammunition sideways through an opening in the side of said tube, said feed mechanism comprising a frame having a vertically extending opening next to the opening in said rammer tube for receiving a belt of ammunition rounds joined by interconnected links, vertically slideable feed means mounted on said frame for elevating said belt one round at a time, side-stripping means for de-linking the round of ammunition aligned with said tube by thrusting the round sideways into the tube, and means connecting said slideable feed means to said side-stripping means for causing the initial upward movement of said feed means to operate said side-stripping means.

27. In an automatic rapid fire gun having a space in its rear portion for receiving a round of ammunition, and an opening in its sidewall leading to said space, an ammunition feed mehcanism comprising:

a frame mounted on said gun adjacent to said opening including slideable feed means for receiving and guiding a belt of ammunition rounds joined by interconnected links;

power means for reciprocating said feed means to move said belt of ammunition one round at a time during the forward stroke of the feed means;

side stripping means movable relative to said frame for de-linking the round of ammunition aligned with said opening and thrusting the round sideways through said opening and completely into said space; and means responsive to initial forward movement of the feed means to operate said side stripping means so as to de-link the round aligned with the opening and thrust it through the opening and completely into the space in the rear portion of the gun during the initial forward movement of the feed means.

28. The ammunition feed mechanism of claim 27 wherein said last recited means includes an obliquely oriented lever pivoted at its lower end to said frame and pivotally attached at its upper end to said side-stripping means which normally extends horizontally toward said opening with said belt passing between the side-stripping means and the opening;

means defining a cam slot in said lever, and a cam follower carried by said slide means riding in said slot, said cam slot having a lower portion angled such that the initial upward movement of said cam follower causes the lever to pivot towards the gun which in turn causes said side-stripping means to be thrust horizontally to de-link a round of ammunition, said slot having an upper portion oriented such that said lever is held by said cam follower in the position determined by said slot lower portion.

29. The feed mechanism of claim 27 including holder pawls for holding said belt stationary while said feed means is on its return stroke.

30. The feed mechanism of claim 27 wherein said power means comprises a piston movable by pressurized fluid and said power means moves both the slide means and the side-stripping means.

31. In an automatic rapid fire gun in accordance with claim 27, an ammunition feed mechanism further comprising:

a second opening, frame, power means, side-stripping means and connecting means on a different side of the gun for feeding rounds from a second store of rounds; and selector means for activating one or the other of said power means to feed ammunition from the selected store.

32. In an automatic rapid fire gun, an ammunition feed mechanism in accordance with claim 31 wherein the ammunition receiving openings for the two feed mechanisms are located on opposite sides of the receiver, and further comprising:

a pair of positioning pawls extending into the receiver adjacent the pair of ammunition receiving openings to block passage of a round out of the receiver through the ammunition receiving openings, the pawls being adapted to pivot inwardly to permit a round of ammunition to enter the receiver through the adjacent opening.

33. The feed mechanism of claim 27 including control means responsive to the absence of a round in said space at the rear portion of the gun for operating said power means.

34. In an automatic rapid fire gun having a space in its rear portion for receiving a round of ammunition, and an opening in its sidewall leading to said space, an ammunition feed mechanism comprising:

a frame mounted on said gun adjacent to said opening including vertically slideable feed means for receiving and guiding a belt of ammunition rounds joined by interconnected links;

power means for reciprocating said slide means vertically to elevate said belt of ammunition one round at a time;

side-stripping means for de-linking the round of ammunition aligned with said opening by thrusting the rounds sideways into said opening;

means connecting said slide means to said side-stripping means for causing the initial upward movement of said feed means to operate said side-stripping means; wherein said side-stripping means is pivotable upwardly by a succeeding round of ammunition.

35. In an automatic rapid fire gun having a space in its rear portion for receiving a round of ammunition, and an opening in its sidewall leading to said space, an ammunition feed mechanism comprising:

a frame mounted on said gun adjacent to said opening including means for guiding ammunition rounds to said opening;

ammunition feed means for engaging successive ones of the rounds in said guide means;

power means for moving said ammunition feed means to drive the round engaged by the ammunition feed means toward said opening;

control valve means for operating said power means; and sensor means extending into said space for detecting the presence or absence of a round in said space at the rear portion of the gun and for operating said control valve means responsive to absence of a round to advance a round toward said opening.

36. In an automatic rapid fire gun having a receiver for rounds of ammunition in its rear portion and at least one opening in its sidewall leading to the receiver interior, a feed mechanism comprising:
- at least two frames mounted on said gun for supplying successive rounds of ammunition from different stores into the receiver;
- a separate ammunition feed means associated with each frame for engaging successive rounds in said frame;
- fluid pressure power means for moving said ammunition feed means to drive the engaged round toward the receiver;
- a feed selector valve associated with said fluid pressure power means for activating one or the other of said ammunition feeding means to feed ammunition from a selected store; and
- a feed control valve operable responsive to the absence of a round in the receiver interior for operating the selecting ammunition feeding means.

37. An automatic gun comprising:
- a barrel having a firing chamber;
- a receiver having a tubular portion aligned with the barrel for guiding a round of ammunition toward the barrel chamber;
- an expended cartridge ejection port intermediate the receiver tubular portion of the barrel;
- a rammer mounted on the receiver for reciprocation to advance rounds from the receiver tubular portion toward the barrel chamber;
- a breech block movable relative to the barrel for sealing a round of ammunition in the firing chamber;
- a deflector disposed between the ejection port and the receiver tubular portion, and mounted for movement from a first position obstructing the path between the barrel chamber and the receiver tubular portion for deflecting ejected cartridges out the ejection port, to a second position clear of said path to permit passage of a round of ammunition traveling from the receiver tubular portion to the barrel chamber;
- means attaching the deflector to the upper wall of the receiver for a pivotable movement between said first and second positions;
- means on the receiver disposing the deflector when in said first position, at an oblique angle extending downwardly and forwardly with respect to the barrel axis; and
- spring means urging the deflector to said first position and yielding to permit said deflector to move to said second position when a round of ammunition is propelled forward by the rammer.

38. An automatic gun in accordance with claim 37 and further comprising:
- means mounting said breech block for pivotal movement about an axis to obstruct and unobstruct the firing chamber; and
- means for reciprocating said axis transverse to the barrel axis for locking the block to the barrel.

39. An automatic gun in accordance with claim 38 and further comprising resilient means urging the breech block into the obstructing position.

40. An automatic gun in accordance with claim 38 and further comprising:
- a hammer pivotably mounted on said breech block for movement relative to said breech block to fire a round in the barrel chamber.

41. An automatic gun in accordance with claim 38 and further comprising:
- a breech ring on the barrel having a locking surface for engaging the rear face of the breech block to lock the breech block in the barrel sealing position; and
- a cam for guiding the breech block so as to move vertically into engagement with the locking surface of the barrel after the breech block has pivoted to the obstructing position, and so as to move downward away from the locking surface prior to pivoting away from the obstructing position in opening the barrel chamber.

References Cited

UNITED STATES PATENTS

| | | | |
|---|---|---|---|
| 453,702 | 6/1891 | Maxim | 89—47 |
| 536,387 | 3/1895 | McKnight | 89—33 X |
| 891,177 | 6/1908 | Mertens | 89—42.6 |
| 2,410,116 | 10/1946 | Vickers | 89—47 X |
| 2,756,635 | 7/1956 | Engel et al. | 89—17 |
| 2,857,813 | 10/1958 | Elliott | 89—33 |
| 3,238,844 | 3/1966 | Carlsson | 89—33.4 |
| 3,277,787 | 10/1966 | Brieger | 89—33 |
| 1,321,422 | 11/1919 | Driggs | 89—23 |
| 1,906,800 | 5/1933 | Marek | 89—177 X |
| 2,213,953 | 9/1940 | Conlon. | |
| 2,594,770 | 4/1952 | Hammar et al. | 89—33 |
| 2,901,945 | 9/1959 | Schlachman | 89—33 X |

FOREIGN PATENTS

| | | |
|---|---|---|
| 117,213 | 7/1946 | Australia. |
| 438,995 | 9/1948 | Italy. |

BENJAMIN A. BORCHELT, Primary Examiner

S. C. BENTLEY, Assistant Examiner

U.S. Cl. X.R.

89—23, 33, 42, 47, 166, 170, 177, 178

UNITED STATES PATENT OFFICE
CERTIFICATE OF CORRECTION

Patent No. 3,500,718                                     March 17, 1970

Eugene M. Stoner

It is certified that error appears in the above identified patent and that said Letters Patent are hereby corrected as shown below:

Column 10, line 40, after "that" insert -- the --. Column 12, line 72, "lower" should read -- lever --. Column 13, line 43, "charged" should read -- charger --. Column 18, line 43, after "instant" insert -- of --; line 56, after "curve" insert -- section --. Column 25, line 55, after "spring" insert -- and being slidably mounted on said rod so that said rammer spring --.

Signed and sealed this 25th day of August 1970.

(SEAL)
Attest:

Edward M. Fletcher, Jr.                          WILLIAM E. SCHUYLER, JR.
Attesting Officer                                         Commissioner of Patents

UNITED STATES PATENT OFFICE
CERTIFICATE OF CORRECTION

Patent No. 3,500,718　　　　　　　　　　　　　　　　March 17, 1970

Eugene M. Stoner

It is certified that error appears in the above identified patent and that said Letters Patent are hereby corrected as shown below:

Column 10, line 40, after "that" insert -- the --. Column 12, line 72, "lower" should read -- lever --. Column 13, line 43, "charged" should read -- charger --. Column 18, line 43, after "instant" insert -- of --; line 56, after "curve" insert -- section --. Column 25, line 55, after "spring" insert -- and being slidably mounted on said rod so that said rammer spring --.

Signed and sealed this 25th day of August 1970.

(SEAL)
Attest:

Edward M. Fletcher, Jr.　　　　　　　　　　　WILLIAM E. SCHUYLER, JR.
Attesting Officer　　　　　　　　　　　　　　　　　Commissioner of Patents